United States Patent
Morgan et al.

(10) Patent No.: US 11,853,230 B2
(45) Date of Patent: *Dec. 26, 2023

(54) ADDRESS OBFUSCATION FOR MEMORY

(71) Applicant: Micron Technology, Inc., Boise, ID (US)

(72) Inventors: Donald M. Morgan, Meridian, ID (US); Sean S. Eilert, Penryn, CA (US); Bryce D. Cook, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/329,989

(22) Filed: May 25, 2021

(65) Prior Publication Data
US 2021/0279183 A1 Sep. 9, 2021

Related U.S. Application Data

(63) Continuation of application No. 16/192,068, filed on Nov. 15, 2018, now Pat. No. 11,042,490.

(51) Int. Cl.
*G06F 12/14* (2006.01)
*G06F 12/02* (2006.01)

(52) U.S. Cl.
CPC ...... *G06F 12/1408* (2013.01); *G06F 12/0238* (2013.01); *G06F 2212/1036* (2013.01);
(Continued)

(58) Field of Classification Search
CPC ............. G06F 12/1408; G06F 12/0238; G06F 12/063; G06F 12/0646–0653;
(Continued)

(56) References Cited

U.S. PATENT DOCUMENTS 5,081,675 A 1/1992 Kittirutsunetorn
9,158,672 B1 10/2015 Zheng et al.
(Continued)

FOREIGN PATENT DOCUMENTS

CN 101419573 A 4/2009
CN 101493794 A 7/2009
(Continued)

OTHER PUBLICATIONS

Wikipedia, "Semiconductor memory", Jul. 3, 2017, Wikipedia, as preserved by the Internet Archive on Jul. 3, 2017, pp. 1-4 https://web.archive.org/web/20170703090244/https://en.wikipedia.org/wiki/Semiconductor_memory (Year: 2017).*

(Continued)

*Primary Examiner* — Curtis James Kortman
(74) *Attorney, Agent, or Firm* — Holland & Hart LLP

(57) ABSTRACT

Methods, systems, and devices for address obfuscation for memory are described. A mapping function may map a logical address of data to a physical address of a memory cell. The mapping function may be implemented with a mapping component that includes mapping subcomponents. Each mapping subcomponent may be independently configurable to implement a logic function for determining a bit of the physical address. The mapping function may vary across memory devices or aspects of memory device, and in some cases may vary over time.

20 Claims, 13 Drawing Sheets

(52) U.S. Cl.
CPC .............. *G06F 2212/7201* (2013.01); *G06F 2212/7208* (2013.01); *G06F 2212/7211* (2013.01)

(58) Field of Classification Search
CPC ..... G06F 2212/1036; G06F 2212/7201; G06F 2212/7208; G06F 2212/7211; G06F 3/0616; G06F 21/14; Y02D 10/00
See application file for complete search history.

(56) References Cited

U.S. PATENT DOCUMENTS

| | | | |
|---|---|---|---|
| 2008/0152142 A1* | 6/2008 | Buer | G06F 21/79 708/250 |
| 2008/0320214 A1* | 12/2008 | Ma | G06F 3/064 711/E12.008 |
| 2009/0319718 A1 | 12/2009 | Aldworth et al. | |
| 2011/0153908 A1 | 6/2011 | Schaefer et al. | |
| 2012/0303873 A1 | 11/2012 | Nguyen et al. | |
| 2013/0097403 A1 | 4/2013 | Zheng et al. | |
| 2013/0124794 A1 | 5/2013 | Bux et al. | |
| 2013/0318362 A1 | 11/2013 | Mothilal | |
| 2017/0046272 A1 | 2/2017 | Farmahini-Farahani et al. | |
| 2017/0123994 A1 | 5/2017 | Pandya et al. | |
| 2017/0256305 A1* | 9/2017 | Niu | G06F 21/00 |
| 2017/0293555 A1 | 10/2017 | Gunnam | |
| 2018/0150389 A1 | 5/2018 | Bhargava et al. | |
| 2018/0247948 A1 | 8/2018 | Kanno | |
| 2018/0329629 A1* | 11/2018 | Hajrullahu | G06F 3/0652 |
| 2019/0108889 A1* | 4/2019 | Gholamipour | G06F 12/0623 |
| 2019/0251038 A1 | 8/2019 | Kang et al. | |
| 2019/0310780 A1 | 10/2019 | Gholamipour et al. | |

FOREIGN PATENT DOCUMENTS

| | | |
|---|---|---|
| CN | 108536612 A | 9/2018 |
| JP | 64-018350 U | 1/1989 |
| JP | 07-503564 A | 4/1995 |
| JP | 2009-086830 A | 4/2009 |
| JP | 2015-075931 A | 4/2015 |
| JP | 2016-514327 A | 5/2016 |
| JP | 2018-142237 A | 9/2018 |
| KR | 10-2012-0037218 A | 4/2012 |
| KR | 10-2018-0061032 A | 6/2018 |
| TW | 466407 B | 12/2001 |
| TW | 201443638 A | 11/2014 |
| WO | 93/23806 A1 | 11/1993 |

OTHER PUBLICATIONS

European Patent Office, "Supplementary European search report and Search Opinion", issued in connection with European Patent Application No. 19884462.3 dated Jul. 12, 2022 (9 pages).

Hashimoto et al., "A Proposal for a Control Program Obfuscation Method by Randomizing Input/Output Addresses", Proceedings of the 75th (2013) Annual National Conference, 3, Japan, General Incorporated Association, Information Processing Society of Japan, Mar. 6, 2013, pp. 3-511 to 3-512.

Japan Patent Office, "Notice of Rejection Ground", issued in connection with Japan Patent Application No. 2021-526547 dated Jun. 14, 2022 (17 pages).

Generating Random Numbers, Nov. 26, 2016, ArduinoLibs, pp. 1-2 http://web.archive.org/web/20161126102052/http://rweather.github.io/arduinolibs/index.html (Year: 2016).

International Search Report and Written Opinion received for PCT Patent Application No. PCT/US19/58147, dated Feb. 25, 2020, 11 pages.

IPO, "Office Action," issued in connection with ROC (Taiwan) Patent Application No. 108138156, dated May 29, 2020 (6 pages).

Korean Patent Office, "Office Action," issued in connection with Korean Patent Application No. 10-2021-7017031 dated Sep. 4, 2023 (24 pages) (13 pages of English Translation and 11 pages of Original Document).

Yuyang, D., et al., An Algebraic-Mapping-Based Phase-Change Memory Matrix Wear-Leveling Method, Journal of computer Research and Development, vol. 49, No. 12, 2021, pp. 2713-2720. (English Abstract).

* cited by examiner

| | Initial Mapping | After 1 Move | After 2 Moves | After 3 Moves | After 4 Moves | After 5 Moves | After 6 Moves | After 7 Moves | After 8 Moves | After 9 Moves |
|---|---|---|---|---|---|---|---|---|---|---|
| | Logical Address of Stored Data | Logical Address of Stored Data | Logical Address of Stored Data | Logical Address of Stored Data | Logical Address of Stored Data | Logical Address of Stored Data | Logical Address of Stored Data | Logical Address of Stored Data | Logical Address of Stored Data | Logical Address of Stored Data |
| Physical Address of Memory Cell | | | | | | | | | | |
| Memory Cell 8 — 1000 (8) | - | 111 (7) | 111 (7) | 111 (7) | 111 (7) | 111 (7) | 111 (7) | 111 (7) | 111 (7) | - |
| Memory Cell 7 — 0111 (7) | 111 (7) | - | 110 (6) | 110 (6) | 110 (6) | 110 (6) | 110 (6) | 110 (6) | 110 (6) | 110 (6) |
| Memory Cell 6 — 0110 (6) | 110 (6) | 110 (6) | - | 101 (5) | 101 (5) | 101 (5) | 101 (5) | 101 (5) | 101 (5) | 101 (5) |
| Memory Cell 5 — 0101 (5) | 101 (5) | 101 (5) | 101 (5) | - | 100 (4) | 100 (4) | 100 (4) | 100 (4) | 100 (4) | 100 (4) |
| Memory Cell 4 — 0100 (4) | 100 (4) | 100 (4) | 100 (4) | 100 (4) | - | 011 (3) | 011 (3) | 011 (3) | 011 (3) | 011 (3) |
| Memory Cell 3 — 0011 (3) | 011 (3) | 011 (3) | 011 (3) | 011 (3) | 011 (3) | - | 010 (2) | 010 (2) | 010 (2) | 010 (2) |
| Memory Cell 2 — 0010 (2) | 010 (2) | 010 (2) | 010 (2) | 010 (2) | 010 (2) | 010 (2) | - | 001 (1) | 001 (1) | 001 (1) |
| Memory Cell 1 — 0001 (1) | 001 (1) | 001 (1) | 001 (1) | 001 (1) | 001 (1) | 001 (1) | 001 (1) | - | 000 (0) | 000 (0) |
| Memory Cell 0 — 0000 (0) | 000 (0) | 000 (0) | 000 (0) | 000 (0) | 000 (0) | 000 (0) | 000 (0) | 000 (0) | - | 111 (7) |

| Logical Address | One Bit = Always Invert One Bit | Physical Address |
|---|---|---|
| 000 | 010 | 2 |
| 001 | 011 | 3 |
| 010 | 000 | 0 |
| 011 | 001 | 1 |
| 100 | 110 | 6 |
| 101 | 111 | 7 |
| 110 | 100 | 4 |
| 111 | 101 | 5 |

| Physical Address of Memory Cell | Initial Mapping Logical Address of Stored Data | After 1 Move Logical Address of Stored Data | After 2 Moves Logical Address of Stored Data | After 3 Moves Logical Address of Stored Data | After 4 Moves Logical Address of Stored Data | After 5 Moves Logical Address of Stored Data | After 6 Moves Logical Address of Stored Data | After 7 Moves Logical Address of Stored Data | After 8 Moves Logical Address of Stored Data | After 9 Moves Logical Address of Stored Data |
|---|---|---|---|---|---|---|---|---|---|---|
| Memory Cell 8 — 1000 (8) | - | 101 (5) | 101 (5) | 101 (5) | 101 (5) | 101 (5) | 101 (5) | 101 (5) | 101 (5) | - |
| Memory Cell 7 — 0111 (7) | 101 (5) | - | 110 (6) | 110 (6) | 110 (6) | 110 (6) | 110 (6) | 110 (6) | 110 (6) | 110 (6) |
| Memory Cell 6 — 0110 (6) | 110 (6) | 110 (6) | - | 111 (7) | 111 (7) | 111 (7) | 111 (7) | 111 (7) | 111 (7) | 111 (7) |
| Memory Cell 5 — 0101 (5) | 111 (7) | 111 (7) | 111 (7) | - | 100 (4) | 100 (4) | 100 (4) | 100 (4) | 100 (4) | 100 (4) |
| Memory Cell 4 — 0100 (4) | 100 (4) | 100 (4) | 100 (4) | 100 (4) | - | 011 (3) | 011 (3) | 011 (3) | 011 (3) | 011 (3) |
| Memory Cell 3 — 0011 (3) | 011 (3) | 011 (3) | 011 (3) | 011 (3) | 011 (3) | - | 000 (0) | 000 (0) | 000 (0) | 000 (0) |
| Memory Cell 2 — 0010 (2) | 000 (0) | 000 (0) | 000 (0) | 000 (0) | 000 (0) | 000 (0) | - | 001 (1) | 001 (1) | 001 (1) |
| Memory Cell 1 — 0001 (1) | 001 (1) | 001 (1) | 001 (1) | 001 (1) | 001 (1) | 001 (1) | 001 (1) | - | 010 (2) | 010 (2) |
| Memory Cell 0 — 0000 (0) | 010 (2) | 010 (2) | 010 (2) | 010 (2) | 010 (2) | 010 (2) | 010 (2) | 010 (2) | - | 101 (5) |

ADDRESS OBFUSCATION FOR MEMORY

CROSS REFERENCE

The present Application for Patent is a continuation of U.S. patent application Ser. No. 16/192,068 by Morgan et al., entitled "ADDRESS OBFUSCATION FOR MEMORY," filed Nov. 15, 2018, assigned to the assignee hereof, and is expressly incorporated by reference in its entirety herein.

BACKGROUND

The following relates generally to memory devices and more specifically to address obfuscation for memory.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source.

Improving memory devices, generally, may include increasing memory cell density, increasing read/write speeds, increasing reliability, increasing data retention, reducing power consumption, reducing manufacturing costs, or increasing the lifetime of the memory device among other metrics. Further, some memory devices have limited endurance or a reduced lifetime due to the memory device wearing out. The wearing out of the memory device may be caused by any number of issues, including normal usage or intentional misuse by a bad actor. Memory device wear out could affect the quality perception of the manufacturer of the memory device or could impact the expected lifetime of the memory device.

BRIEF DESCRIPTION OF THE DRAWINGS

FIG. 6 illustrates an example of a mapping function and wear leveling function that supports address obfuscation for memory in accordance with aspects of the present disclosure.

FIG. 9 illustrates an example of a mapping function and wear leveling function that supports address obfuscation for memory in accordance with aspects of the present disclosure.

DETAILED DESCRIPTION

Figure 1:
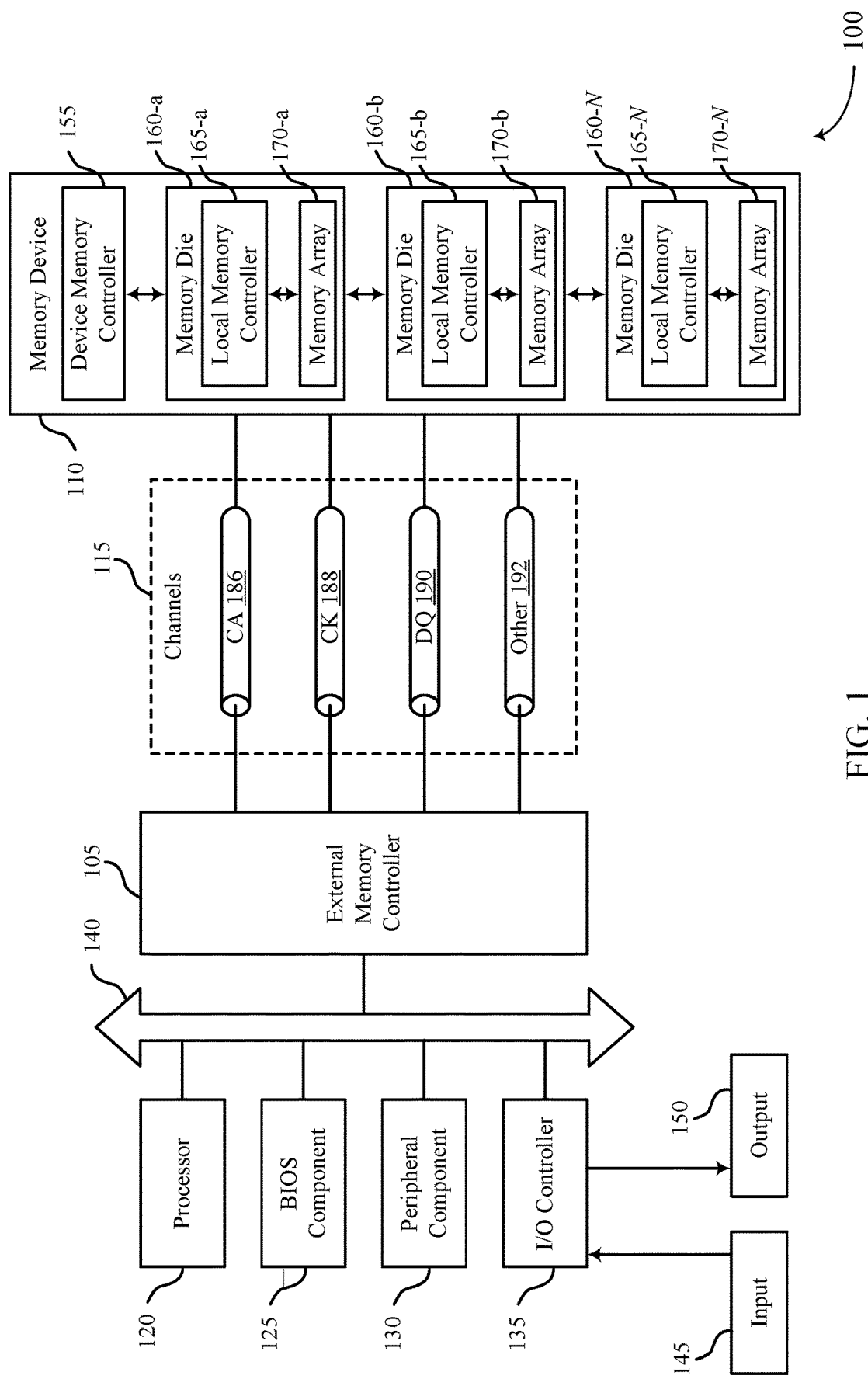
FIG. 1 illustrates an example of a system for address obfuscation for memory in accordance with aspects of the present disclosure.

Improving the lifetime of a memory device may be achieved in a number of ways. One way to achieve improved lifetime or endurance of a memory device is through wear-leveling, which may provide substantially even wear between the memory cells of the memory device. Wear-leveling may include, for example, transferring data from one physical location to another physical location within a memory array (or across memory arrays), which may prevent one memory cell of a memory array from being written or read more (e.g., significantly more) than another memory cell. Excessive accesses may decrease the lifetime of an overused memory cell compared to a memory cell that is not accessed as often, and thus wear-leveling may protect the memory device against overuse of individual memory cells that may cause the memory cell to prematurely fail.

Memory device lifetime may be affected not only through normal use, but also may be compromised by malicious use—e.g., through row hammer or other malicious attacks. Should a bad actor manager to deduce (reverse engineer) the pattern in which the wear-leveling function transfers data within a memory array, the bad actor may be able to circumvent the wear-leveling function and induce wear out. In some examples, memory wear out could result in a failure or storage mechanisms or unauthorized access by the bad actor to sensitive data or unauthorized control of protected processes or functions. In some examples, a physical memory cell may fail (become detective), which may allow the bad actor to follow the movement progression of logical data relative to the failed cell and to thereby reverse engineer the movement pattern of the wear-leveling function. In some cases, once a wear-leveling function has been reverse-engineered in one memory device, all memory devices that employ the same wear-leveling function may become subject to abuse by the bad actor.

As discussed herein, address obfuscation of memory may include mapping logic addresses for data to physical addresses within one or more memory arrays in an unpredictable manner, which may vary across memory arrays or over time for the same memory array. For example, the mapping function used to map logic addresses for data to physical addresses of the memory cells that store the data may be selectable, or customizable, on a per-device, per-die, per-array or other basis. In some cases, the physical address of the data may change over time (that is, the data may be moved from one memory cell to another) in accordance with a wear-leveling function, after having been initially determined in accordance with address obfuscation techniques as described herein. The address obfuscation techniques, and their variability over time or across memory entities, may increase the difficulty for a bad actor to reverse-engineer a wear-leveling function.

Further, even if a bad actor does manage to reverse-engineer the wear-leveling function, such information as obtained by the bad actor may not be useful for other devices, dice, arrays, etc., or for the reverse-engineered device, die, array, etc. at a later time, as the operative mapping function—and thus the relationship between logic addresses for data and the physical addresses of the memory cells storing the data—may be adjusted over time (e.g., upon a trigger event such as a boot or reboot event, or on a scheduled basis) or vary across devices, dice, arrays, etc. (e.g., based on random number generators included in such entities, unique identifiers of such entities, etc.). The mapping function may be configurable and variable on a per-logical-address-bit basis based on a selectable set of per-bit logic operations such that an extremely large number of possible mapping functions may be supported (e.g., for logical addresses having N bits, where any one of M logic operations may be selected for each bit, $M^N$ possible mapping functions may be supported).

Systems and techniques are provided for implementing a configurable (e.g., selectable) and variable (e.g., dynamically during operation or suing mid- or post-fabrication techniques) mapping function that maps logical addresses of data to physical addresses of memory cells within a memory array that store the data. An access command may be received at the memory device and from a host, and the access command may include the logical address of data stored in the memory array and a physical address may be determined based on the logical address and the mapping function, and the stored data may be accessed. A logic operation may be selected for each individual bit of the logical address and, collectively, these logic operations may implement a mapping function, where a bit of the physical address for the memory cells may be determined by (e.g., based on) the mapping function. The mapping functions (e.g., constituent logic operations) may be configured (chosen, selected) in a number of ways on a number of bases as discussed in further detail herein, and in some cases may be dynamically or otherwise varied over time or across devices.

Features of the disclosure are initially described in the context of a memory system. Features of the disclosure are described in the context of a memory system configured to map logical addresses to physical addresses at a memory cell level as well as related address obfuscation and wear-leveling tables. These and other features of the disclosure are further illustrated by and described with reference to apparatus diagrams, system diagrams, and flowcharts that relate to address obfuscation for memory.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card. In some examples a host may issue an access command which may include a logical address of data stored in a memory array. The logical address may map to a physical address within the memory array and the physical address may be determined at least in part by the logical address and a selected mapping function.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package). In some cases, different memory devices 110, or even different dice 160 or different memory arrays 170 within a die 160, may map logical addresses to physical addresses using different mapping functions.

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein. System 100 may additionally include a selection component and a mapping component as discussed herein.

The memory device 110 may include a device memory controller 155 and one or more memory dice 160. Each memory die 160 may include a local memory controller 165 (e.g., local memory controller 165-*a*, local memory controller 165-*b*, and/or local memory controller 165-N) and a memory array 170 (e.g., memory array 170-*a*, memory array 170-*b*, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2. Each memory array may include memory cells which each may have a corresponding physical address. The memory cells may store data and the data may be periodically transferred among the memory cells for wear-leveling purposes. When moving data between memory cells of the memory array, logical addresses for the data may remain static (fixed) to support tracking the location of the data by the memory device 110 (e.g., by one or more controllers therein) or by the external controller 105.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-*a*, memory die 160-*b*, and/or any number of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the number of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120. In some examples, one or more memory controllers—e.g., one or more of the device memory controller 155 or local memory controllers 165— may include a selection component. The selection component may select, for each bit of a physical address (or in some cases for each bit of the physical address), a corresponding logic operation for determining the bit of the physical address based on or more bits of a logical address. The logic operation may comprise a pass-through (non-inverting, transparent) operation, an inversion operation, an exclusive or (XOR) operation, an XNOR operation, an address swap operation, or another suitable logic operation as may be appreciated by one of skill in the art. The logical address thus may map to (be mapped to by a mapping function) a physical address at which requested data may be stored.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths. In some cases, a logical address (logical address bits) for data to be accessed (written to or read from) the memory device 110 may be received by the memory device over one or more CA channels 186.

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. In some cases, the clock signal may be a 1.5 GHz signal. A CK channel 188 may include any number of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any number of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some cases, a memory device 110 may implement address obfuscation to map between logical addresses for identifying data and physical addresses for storing data in an unpredictable manner, which may operate in conjunction with wear-leveling techniques, and which may prevent a bad actors from applying the reverse-engineered data movement patterns to different memory devices, even memory devices that employ the same wear-leveling function. For example, the memory device 110 may include at least one selection component and mapping component (e.g., in some cases, may include multiple selection components and/or multiple mapping components corresponding to multiple dice 160 or arrays 170). The selection component may be coupled with an interface and may select a mapping function. The mapping function may map a logical address for data to a physical address of one or more memory cells for storing the data within a memory array. For example, the selection component, may select, for each bit of the physical address, a corresponding logic operation for determining the bit of the physical address based on or more bits of the logical address. Each of the individual bits of the logical address may be routed through one or more mapping subcomponents to determine the physical address. The mapping function (e.g., the logic operations implemented by the mapping subcomponents) may be selected in any number of ways, including, for example, based on a number (e.g., random number) generated by a number generator (e.g., random number generator). In some cases, a mapping function may be selected or configured (e.g., during or post-fabrication) based on one or more identifiers associated with the memory device 110 (e.g., identifiers of dice 160 or arrays 170 or other aspects of the memory device).

Figure 2:
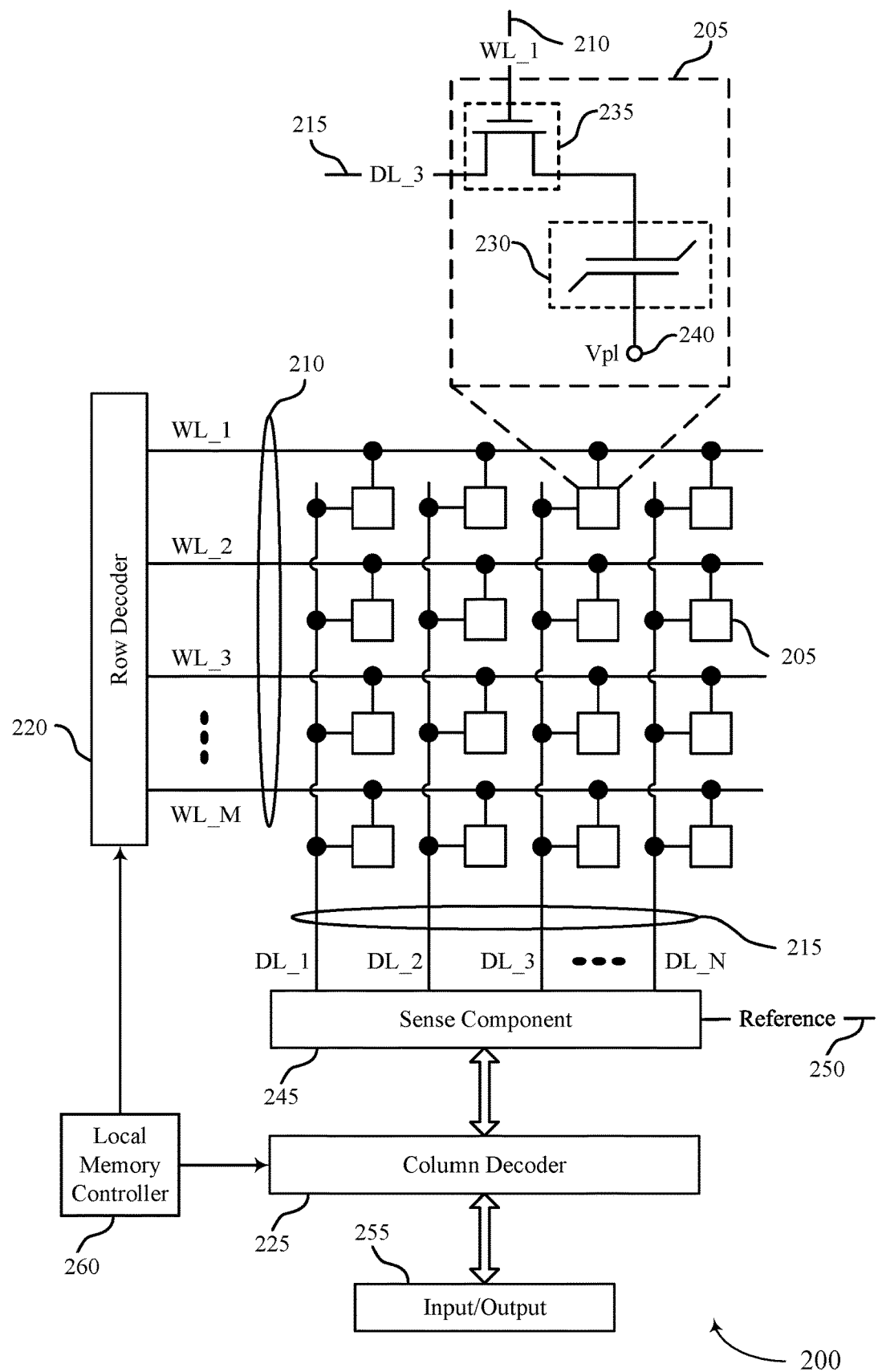
FIG. 2 illustrates an example of a memory die that supports address obfuscation for memory in accordance with aspects of the present disclosure.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11). In some cases, data may be stored in a memory cell and the data may have a logical address associated with it. The logical address may be fixed (static) for the data and may be mapped to a physical address of the memory cell in which the data is stored. In some cases, the physical address of the data may change over time (that is, the data may be moved from one memory cell to another) in accordance with a wear-leveling function, after having been initially determined in accordance with address obfuscation techniques as described herein. The mapping between the logical address and the physical address of the memory cell may be provided by a mapping function as described herein.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205, and may be identified by a set of bits comprising a physical address, which may be referred to as physical address bits.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Val, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. In some cases, the local memory controller 260 may receive physical addresses that include physical address bits via an interface from a mapping component. The mapping component may be discussed in detail herein. In some cases, the local memory controller 260 may receive the physical addresses from the device memory controller. The device memory control may receive the physical addresses via an interface and from the mapping component.

The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
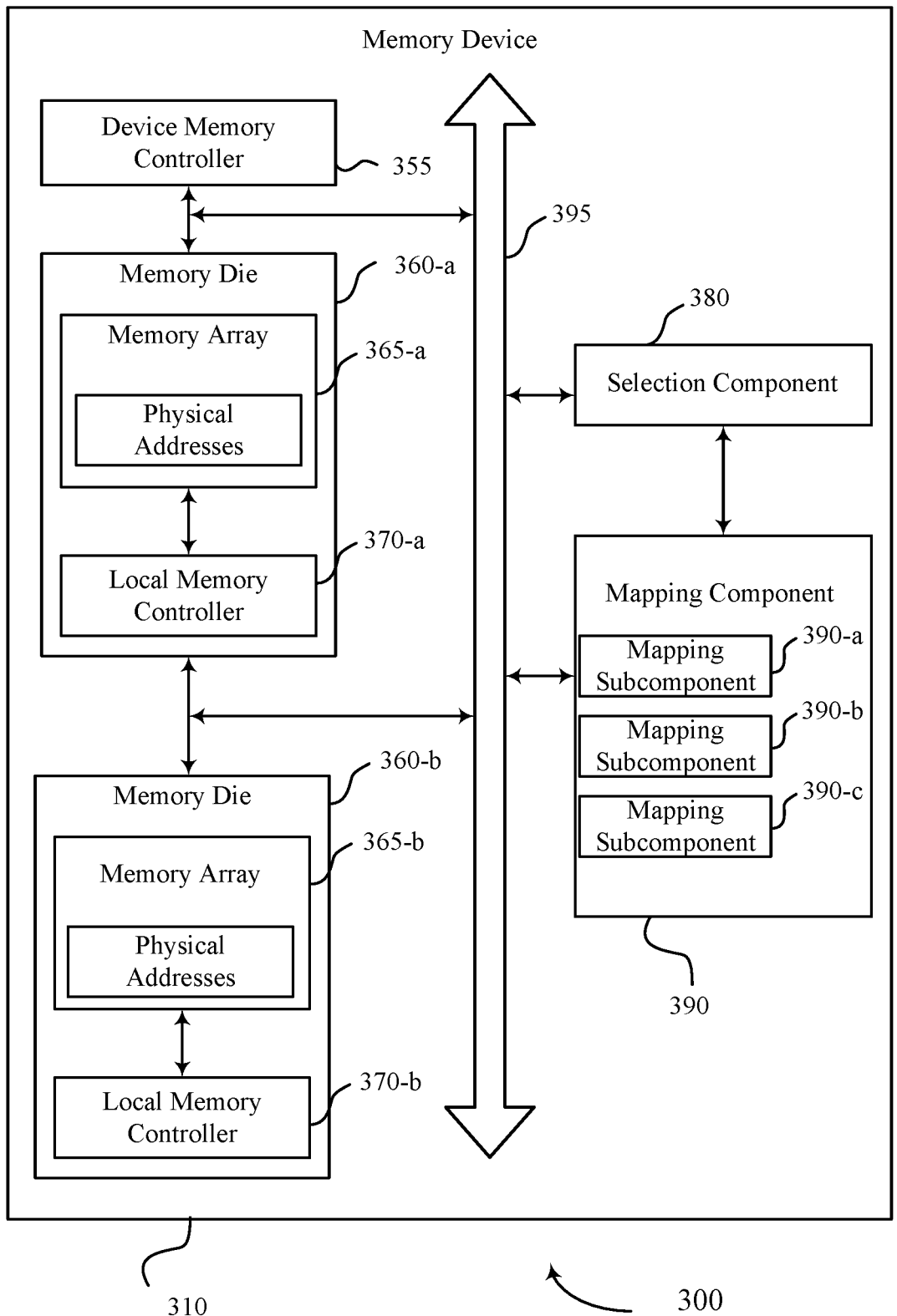
FIG. 3 illustrates an example of a device that supports address obfuscation for memory in accordance with examples of the present disclosure

FIG. 3 illustrates an example of a system 300 for address obfuscation for memory. In some examples, system 300 may include one or more components described above. For example, system 300 may include a memory device 310, which may be an example of a memory device 110 as described with reference to FIG. 1; memory dice 360, which may each be an example of a memory die 160 as described with reference to FIG. 1; memory arrays 365, which may each be an example of a memory array 170 as described with reference to FIG. 1. System 300 may include a selection component 380, a mapping component 390, one or more mapping subcomponents 390, and an interface 395. In some examples, the interface 395 may be configured to receive logical addresses for accessing data stored in memory cells of a memory array 365. The logical addresses received at the interface 395 may be issued by a host device (e.g., an external controller 105 or processor 120). The interface 395 may be coupled with the selection component 380.

In some examples, a memory device 310, may include one or more memory dice 360, which may include one or more memory arrays 365. The memory arrays 365 may include memory cells which may each store one or more logic states, for example, a high-state and a low-state, or other non-binary states. In some examples, the high-state may be referred to herein as a "one" and the low-state, may be referred to herein as a "zero". Each of the memory cells of the memory arrays 365 may have a physical address. The physical address of the memory cell may indicate or reflect a physical location on the memory die or within a memory array 365 at which the memory cell may be located, or otherwise may identify the memory cell.

The system 300 of FIG. 3 may include a selection component 380 which may be coupled with an interface 395 and a mapping component 390. The selection component 380 may be configured to select a mapping function from a set of mapping functions supported by the mapping component 390. For example, the selection component 380 may be configured to select a logic operation for each mapping subcomponents 390 from a supported set of logic operations. In some cases, the selection component 380 may select the logic operations for some or all of the mapping subcomponents 390 independently of one another. The mapping function (e.g., the collection of selected logic operations) may map a logical address of data to the physical addresses of the memory cells that store the data within a memory array 365. In some cases, a single mapping component 390 may interact with (provide one or more mapping functions for) multiple memory dice 360 or multiple memory arrays 365. In some cases, a mapping component 390 may be specific to (e.g., included in or otherwise coupled with) a single memory die 360 or memory array 365. In the example of FIG. 3, the mapping component 390 may include mapping subcomponents 390-a, 390-b, and 390-c and the mapping component 390 may be coupled with an interface which may be configured to receive logical addresses.

In some cases, the selection component 380 may vary a mapping function implemented by a mapping component 390 over time. For example, the selection component 380 may vary a mapping function implemented by a mapping component 390 accordingly to a schedule (periodic or aperiodic), in response to an event trigger (e.g., a boot or reboot event, a command from host device, a count of access operations reaching a threshold, detection of a row hammer event or other malicious attack, etc.). In some cases, the selection component 380 may select a mapping function based on an input, such as number (e.g., random number) received from another aspect of the memory device 310 (e.g., a random number generator) or from a host device.

In some cases, the selection component 380 may select a mapping function based on a unique identifier of the memory device 310 or other entity (e.g., of a memory die 360 or memory array 365). For example, the selection component 380 may read some or all of the unique identifier from a mode register. In some cases, the mapping function implemented by a mapping component 390 may be fixed (hard-wired) during manufacture, by setting trim parameters, or via a fuseload procedure, and selection component 380 may be configured to store or read an indicator of the fixed mapping function and configure the mapping component 390 accordingly.

Figure 4A:
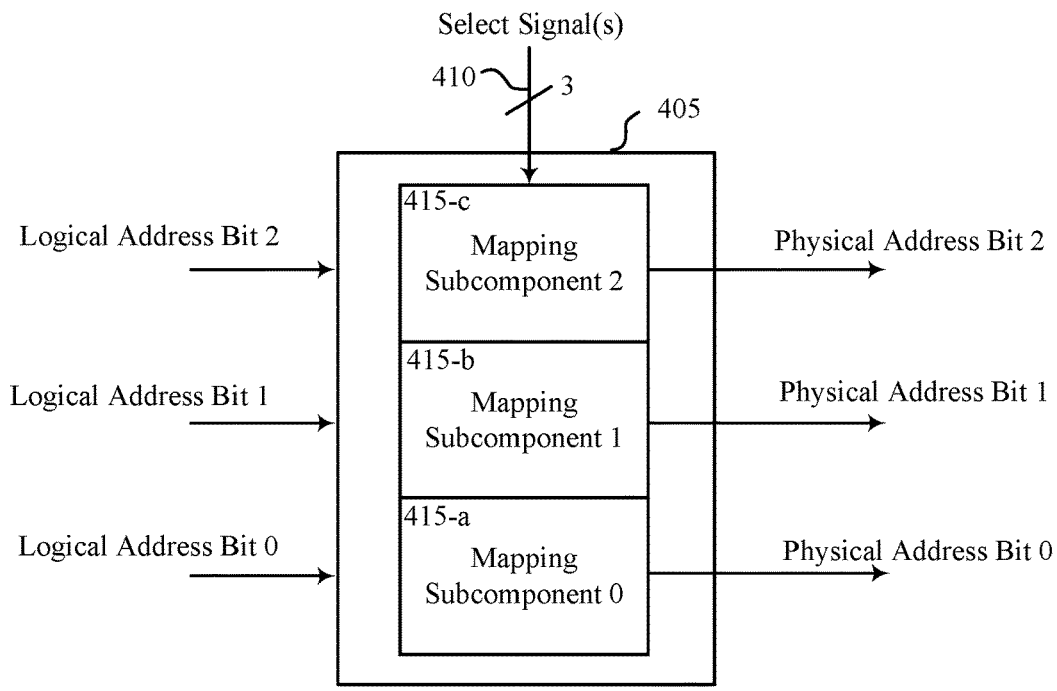
FIGS. 4A and 4B illustrate examples of devices that support address obfuscation for memory in accordance with aspects of the present disclosure.
Figure 4B:
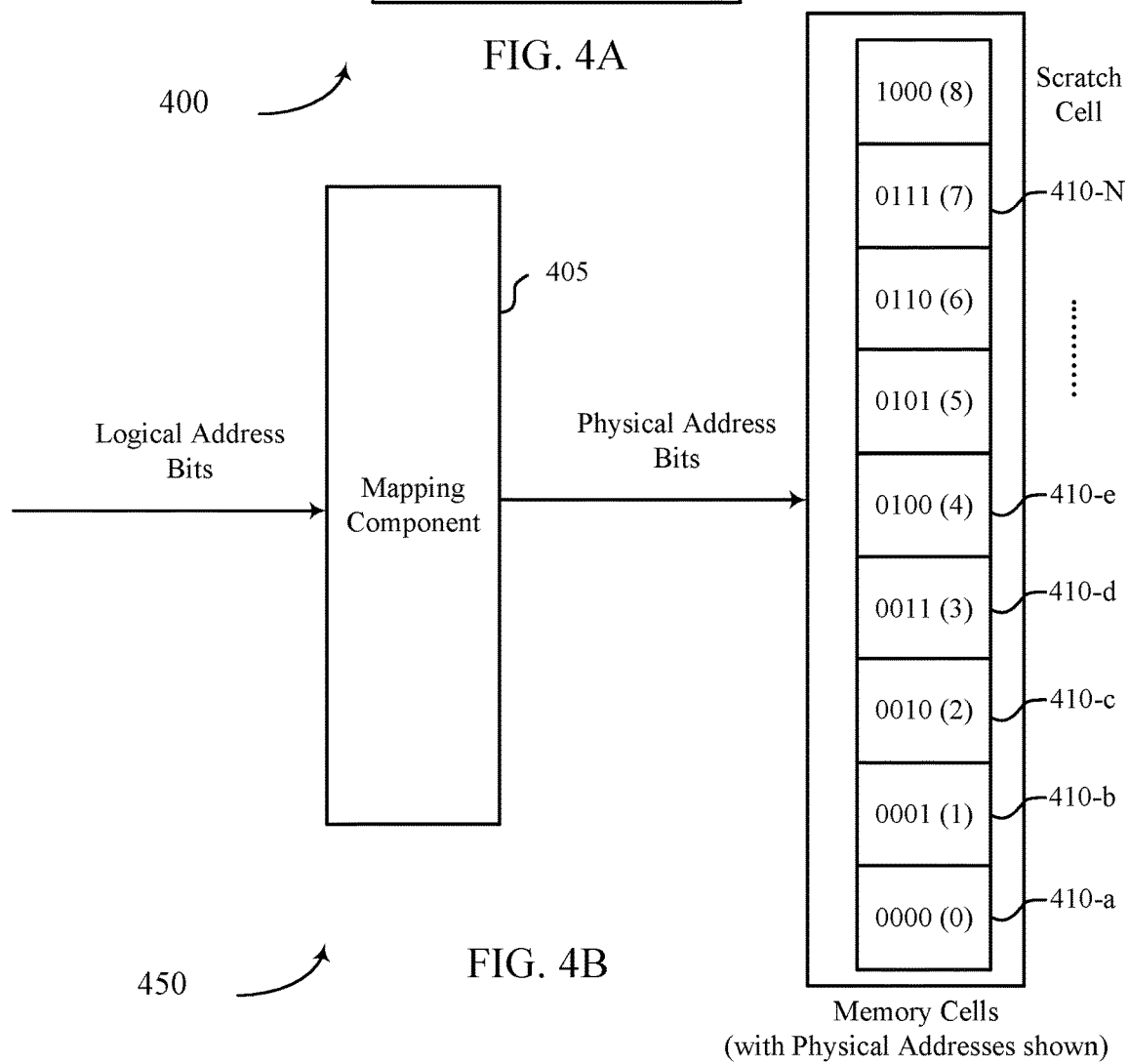

FIGS. 4A & 4B illustrate examples of systems 400 and 450 that each support address obfuscation for memory in accordance with aspects of the present disclosure. In some examples, FIGS. 4A and 4B may include one or more components described above. For example, FIGS. 4A and 4B may include mapping components and mapping subcomponents as described with reference to FIG. 3.

As previously discussed, a mapping function may be selected by a selection component and may be implemented by the mapping component. The selected mapping function may may include a set of selected logic operations or functions to perform on each bit of the logical address (the logical address bits) to determine a corresponding physical address (corresponding physical address bits). Supported and selectable logic operations may include invert, non-invert (pass-through), OR, XOR, XNOR, AND, NAND, and so forth. The mapping function may include a logic operation for each of the logical address bits. For example, in the case of a three-bit logical address, the mapping function may include a set of logic operations such that bit zero and bit one will both be inverted, and bit two will be non-inverted. In such an example, if the logical address is 110, this mapping function may provide a physical address of 000. In some cases, one or more selected logic operations may be based on multiple logical address bits (e.g., an XOR of two logical address bits), or bits from multiple logical addresses (e.g., a swap of one or more bits from logical addresses associated with two sets of data, which may be referred to as an address swap). Logic operations may be independently selectable for each bit of the logical address bits or each determined physical address bit and may also be varied from memory die to memory die, from memory array to memory array, etc. as well as over time as described herein. It is to be understood that logical addresses and physical addresses each may include any number of bits, and potentially very large numbers of bits, but that examples herein may be explained with a small number of bits for illustrative clarity.

As illustrated in FIG. 4A, a logical address may include logical address bits. In one case, a logical address may include three logical address bits such as 110, in which the zero bit is a 1, the one bit is a 1, and the two bit is a zero. The logical address bits may be inputs into a mapping component 405 which may include mapping subcomponent 0 415-a, mapping subcomponent 1 415-b, and mapping subcomponent 2 415-c. The mapping component may output physical addresses which may include three physical address bits, such as physical address bit zero, physical address bit one, and physical address bit two.

As illustrated in FIG. 4A, select line 410 may select a mapping function for mapping component 405, which may comprise selecting a logic function to be applied by each of the three mapping subcomponents 415-a, 415-b, and 415-c. Based on the logic operation selected for a mapping subcomponent 415, the mapping component 405 may route one or more logical address bits to the mapping subcomponent as appropriate. For example, if the logic operation for a mapping subcomponent 415 is an invert or non-invert operation, the mapping component 405 may route only one logical address bit to the mapping subcomponent 415, but if the logic operation for a mapping subcomponent 415 is an XOR, XNOR, or other combinatorial logical operation, the mapping component 405 may route two or more logical address bits to the mapping subcomponent 415.

In some examples, the select line may be coupled with a selection component, which may select the mapping function, e.g., based on a number received by the selection component or based on a unique identifier of the memory die. For example, the unique identifier may have a series of numbers and in one example the selection component may use the last three numbers of the memory die ID. For example, if the last three numbers are odd, odd, even, the select line may select a first mapping function, but if the last three numbers of the memory die are odd, even, even, the select line may select a second mapping function.

In the example of FIG. 4B, logical address bits may be provided to a mapping component 405. The mapping component 405 may output physical address bits. The physical address bits may designate physical addresses of memory cells (e.g., 410-a, 410b, 410c and so forth to 410-N). As previously discussed with respect to FIG. 4A, the physical address 011 or three may have three physical address bits, the zero bit is 1, the one bit is 1 and the two bit is 0. As illustrated in FIG. 4B, there may be one or more scratch cells, where a scratch cell may refer to a memory cell whose physical address is not addressable via the mapping function but to which data may be transferred for wear-leveling purposes. Thus, as shown in FIG. 4, the physical address space may be larger than the logical address space, as the physical address space may encompass at least one more possible physical address (and thus in at least some cases at least one additional more significant bit) than the number of possible logical addresses encompassed by the logical address space.

Figure 5:
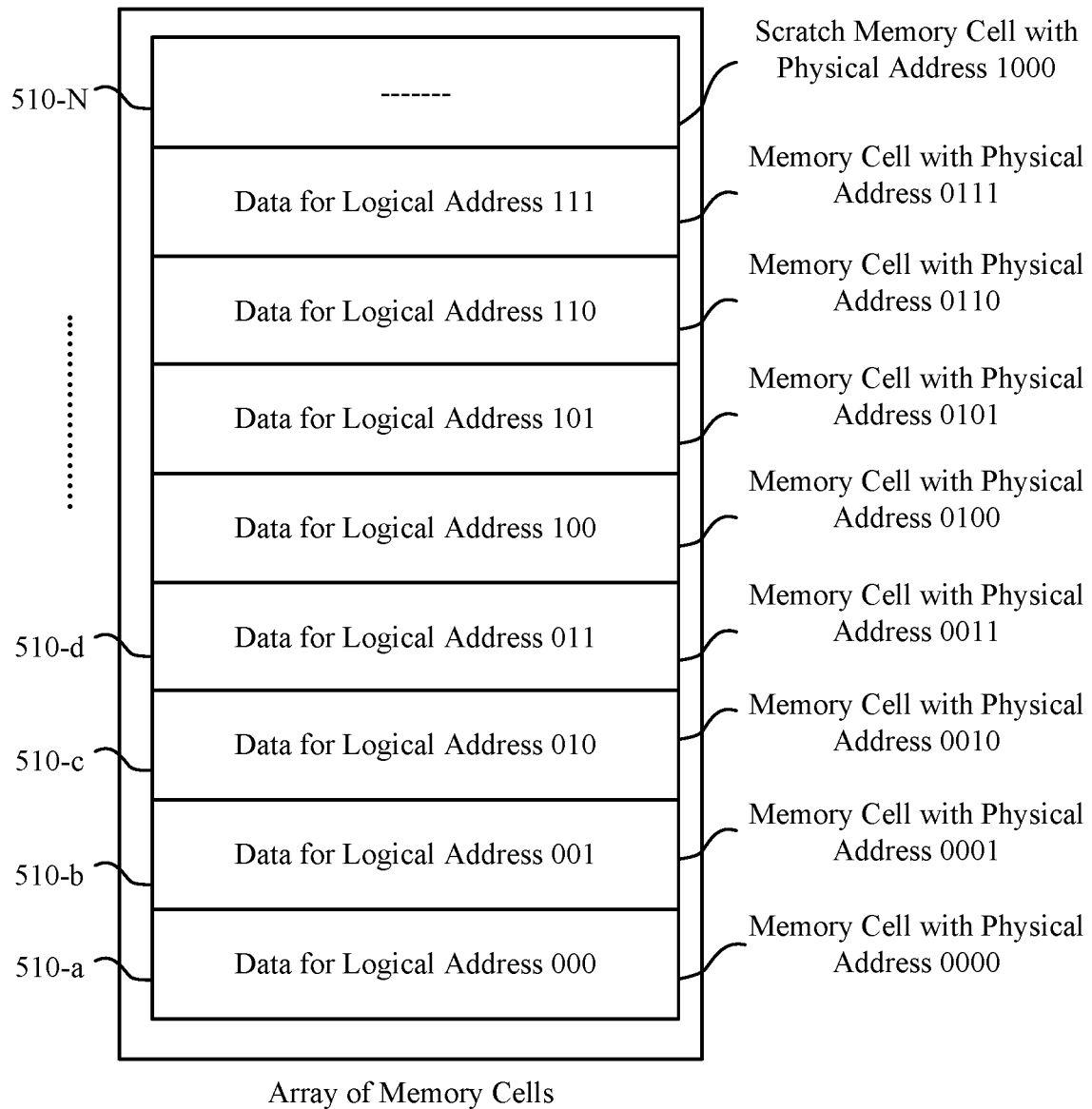
FIG. 5 illustrates an example of a mapping function that support address obfuscation for memory in accordance with aspects of the present disclosure.

FIG. 5 illustrates an example of a memory array 500 that supports address obfuscation for memory in accordance with aspects of the present disclosure. In some examples, discussion of FIG. 5 may include discussion of one or more components described above. For example, discussion of FIG. 5 may include discussion of physical addresses, logical addresses, and memory cells of memory arrays as described above.

In the example of FIG. 5, the memory array 500 be an array of memory cells. The individual memory cells 510-a, 510-b, 510-c . . . 510-N may each include stored data. FIG. 5 illustrates an example wherein the mapping function comprises all non-invert or pass through logic operations, and thus each physical address bit is equal to the corresponding (of equal significance) logical address bit. The physical address may be expressed with four physical address bits since the scratch cell is the eighth memory cell which may be expressed as 1000 in binary digits.

For example, memory cell 510-a may have physical address 0000 and store data having a logical address 000, memory cell 510-b may have physical address 0001 and store data having a logical address 001, memory cell 510-c may have physical address 0010 and store data having a logical address 010, and so on. That is, data may be stored in memory cell having a physical address for which the three least significant bits are equal to the logical address of the data.

In some cases, a mapping function such as that illustrated in FIG. 5, which comprises a non-invert or pass through logic operation for each logical address bit, may support testing or debugging of a memory device. In some cases, a security key—e.g., a command sequence or other specialized input to the memory device—may cause the selection component to select the mapping function illustrated in FIG.

5 (e.g., configure all operative mapping subcomponents to implement a non-invert or pass through logic operation).

FIG. 6 illustrates an example of a table 600 that illustrates address obfuscation and wear-leveling for memory in accordance with aspects of the present disclosure. In some examples, discussion of FIG. 6 may include discussion of one or more components described above. For example, discussion of FIG. 6 may include discussion of physical addresses, logical addresses, and memory cells of memory arrays as described above.

In some examples, data may be periodically moved to different physical locations (different memory cells having different physical addresses) to provide wear-leveling for the memory cells, as repeated accesses to a memory cell may prematurely cause a failure in that particular memory cell. Wear-leveling may distribute the stress between the memory cells of the memory arrays. By moving the data to different memory cells over time, the lifetime of the memory cell and the ability of the memory cell to store data may be increased.

Table 600 shown in FIG. 6 illustrates the operation of an example wear-leveling function subsequent to the use of a mapping function as illustrated in FIG. 5. Thus, the "initial mapping" column shows data as mapped in FIG. 5, with each of memory cell 0 through memory cell 7 storing data having a logical address equal to the three least significant bits of the memory cell's physical address. Memory cell 8 may function as a scratch memory cell and may initially be empty, as its physical address may be beyond the logical address domain.

The movement of the data from memory cell to memory cell over time in accordance with the example wear-leveling algorithm is indicated in table 600 of FIG. 6 as "After 1 move", "After 2 moves", After 3 moves", and so forth. This indicates the data is being moved a first time, moved a second time, and moved a third time, respectively. Accordingly, the data may have a different physical address after each move since it has been moved or transferred to a different memory cell.

After one move as part of the wear-leveling function and as indicated in the "After 1 move" column, the data with the logical address 111 (7) is now stored in the scratch memory cell having the physical address 1000 (8), and the memory cell having the physical address 0111 (7) is empty. Thus, the physical address of the data with the logical address 111 (7) was incremented by one during the first move, and the physical address of the memory cell that is empty after 1 move (memory cell 7) is one lower than the physical address of the memory cell that was initially empty (memory cell 8).

After two moves as part of the wear-leveling function and as indicated in the "After 2 move" column, the data with the logical address 110 (6) is now stored in the memory cell having the physical address 0111 (7), and the memory cell having the physical address 0110 (6) is empty. Thus, the physical address of the data with the logical address 110 (6) was incremented by one during the second move, and the physical address of the memory cell that is empty after 2 moves (memory cell 6) is one lower than the physical address of the memory cell that was empty after 1 move (memory cell 7).

As show in table 600, this wear-leveling movement pattern may continue for any duration of time and any number of moves. With each move, (i) the data stored at the physical address one lower than the physical address of the empty memory cell is moved into the empty memory cell and (ii) the memory cell that previously stored the moved data becomes empty. In the event that one of the memory cells becomes defective (fails)—e.g., due to a row hammer attack or for some other reason—the wear-leveling pattern may be reverse-engineered. For example, an access operation (e.g., read or write) for data stored to the defective memory cell will fail, and the logical address of the data that fails will change over time based on the wear-leveling movement.

In the example of table 600, it is assumed that memory cell 3 (physical address 011) has become defective. During an initial period (before the fifth move occurs), an access attempt for the data having logical address 011 (3) will fail. Subsequently (after the sixth move occurs), an access attempt for the data having logical address 010 (2) will fail. Eventually (after some number of additional moves), an access attempt for the data having the logical address 001 (1) will fail. Thus, a pattern of failing data, as identified by the data's logical address, may become evident over time. In the example of table 600, the pattern of failing data, as identified by the data's logical address would be, in decimal terms, 3, 2, 1, 0, 7, 6, 5, 4. and so on. The pattern of physical movement of that data among the memory cells—that is, the pattern of changes to the physical address at which data is stored—may be deduced from such a pattern of failing data, as identified by the data's logical address.

Further if the same wear-leveling mapping function is applied to all memory arrays within all the memory devices of a given make or model, at all times (e.g., is hardwired or otherwise statically configured), then a bad actor may be able to use knowledge of the wear-leveling pattern as deduced from one memory device or memory array in order to attack other memory devices or memory arrays (e.g., to execute row-hammer attacks on such other memory devices or memory arrays).

Figures 7A, 7B:
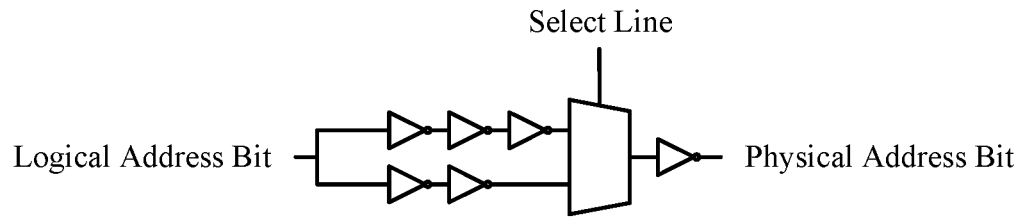
FIG. 7A illustrates a device that supports address obfuscation for memory in accordance with aspects of the present disclosure.
FIG. 7B illustrates an example of a mapping function that support address obfuscation for memory in accordance with aspects of the present disclosure.

FIGS. 7A and 7B illustrate examples of an apparatus that support address obfuscation for memory in accordance with aspects of the present disclosure and a and a table that shows a mapping function as implemented in accordance with aspects of the present disclosure. In some examples, discussion of FIGS. 7A and 7B may include discussion of one or more components described above. For example, discussion of FIGS. 7A and 7B may include discussion of physical addresses, logical addresses, and memory cells of memory arrays as described above.

In some examples and as illustrated in FIG. 7A, a mapping subcomponent 700 may be configured to determine bits of a physical address based on bits of a logical address. As discussed in FIG. 4A, mapping component may include mapping subcomponents, which may each be configured (e.g., independently) to determine a corresponding bit of a physical address based on or more bits of a logical address (or one or more bits of multiple logical addresses).

The mapping subcomponent 700 may be configured to receive a logical address bit as the input and provide a physical address bit as the output, and may be configured to selectively implement either an inversion logic operation or a non-inversion (pass-through) logic function. The three inverter logic devices in the upper path of the mapping subcomponent 700 may be delay matched with the two inverter logic devices in the lower path of the mapping subcomponent. The output of the upper path and the output of the lower path may be coupled with respective inputs of a multiplexer or other suitable selection circuit, and the select line of the mapping subcomponent 700 may select one of the two paths to route to the output, which may be inverted to yield the determined physical bit corresponding to the mapping subcomponent 700. Thus, by selecting either the upper path or the lower path, the select line may control whether the physical address bit may be inverted (e.g., opposite value of the logical address bit input) or non-inverted (e.g., the same value of the logical address bit input). In this example, if the select line selects the upper path, the output physical address bit may be the same value as the input logical address bit, due to the resulting four inverters in the signal path from the logical address bit to the physical address bit. If the select line selects the lower path, the output physical address bit may be inverted and thus be the opposite value as the input logical address bit, due to the resulting three inverters in the signal path from the logical address bit to the physical address bit.

In some examples, a logic operation of a mapping function may generally be implemented by the mapping subcomponent 700. The logic operation may be a logic element which performs a function on a single logical address bit to yield a physical address bit. For example, the logic operation may be an invert operator. By using the invert logic operation, the mapping subcomponent may change the relevant bit to the opposite value. For example, the invert logic operation may invert the one bit, thus 110 may become 100, or the invert logic operation may invert the zero bit, thus 110 may become 010, and so forth. One of ordinary skill in the art will appreciate that any number of logic operations may be supported by a mapping subcomponent 700—e.g., XOR, XNOR, OR, NOR, AND, NAND, etc.—via a combination of suitable logic gates and routing (switching) circuitry, and that a mapping subcomponent 700 may be configured to support a number of such logic operations in a selectable fashion so as to determine a physical address bit based on any number of logical address bits using any combination of one or more logic operations.

For example, in some cases, the logic operation which may be implemented by the mapping subcomponent may operate on two or more logical address bits to yield a single physical address bit. For example, the logic operation may be an OR operator. By using the OR logic operation, two of the logical address bits may be designated to perform the logic operation. In one case the OR logic operation may be performed on the zero bit and the one bit of the logical address bits to yield the zero bit of the physical address bits, where the one bit and the two bit of the physical address bits remain the same (e.g., the one bit and the two bit are non-inverted). Given a logical address 011, and using the OR logic operation, the zero bit of the physical address bit may be 1, since the OR function of 0 and 1 is 1, thus making the zero bit of the physical address bit a 1 and the physical address become 111.

As another example, the logic operation which may be implemented by the mapping subcomponent may operate on three logical address bits to yield a single physical address bit. For example, the logic element may perform a function on three logical address bits to yield a single physical address bit. For example, the one bit of the physical address may be the function: one bit XOR zero bit xNOR two bit of the logical address bits for the logical address 010. The physical address may become 000 as the logical address one bit is 1 which is XORed with the logical address zero bit which is 0, and which yields 1, XNORed with logical address two bit which is 0, which yields 0. Accordingly, using the logical address 010, one bit which is 1 becomes a 0, making the physical address 000.

In some examples and as illustrated in FIG. 7B, a table 750 illustrates the mapping of three binary bits of a logical address to a corresponding physical address of a memory cell. For example, the value zero may be represented by three binary bits, 000. Further, the individual bits may be referred to as the zero bit, the one bit, and the two bit. For example, using the binary value 110 (six), the two bit is a one, the one bit is a one and the zero bit is a zero. In another example, 011 or binary value three, the two bit is a zero, the one bit is a one and the zero bit is a one.

In FIG. 7B, the value one may be represented by three binary bits 001, and the value two may be represented by three binary bits 010, and so forth. As illustrated in FIG. 7B, the zero bit may be always non-inverted, the one bit of each of the logical address may always be inverted, and the two bit may be always non-inverted. For example, the value zero or three binary bits 000, becomes 010 or the value two after the one bit is inverted. The value one or three binary bits 001, becomes 011 or the value three after the one bit is inverted. The value two or three binary bits 010, becomes 000 or the value zero after the one bit is inverted. Additionally, the values of the table in FIG. 7B may be produced using three mapping subcomponents as illustrated in FIG. 7A, in which the mapping subcomponent for bit 0 of the physical address bit may be configured to pass through bit 0 of the logical address, the mapping subcomponent for bit 1 of the physical address bit may be configured to invert bit 1 of the logical address, and the mapping subcomponent for bit 2 of the physical address bit may be configured to pass through bit 2 of the logical address.

Figure 8A:
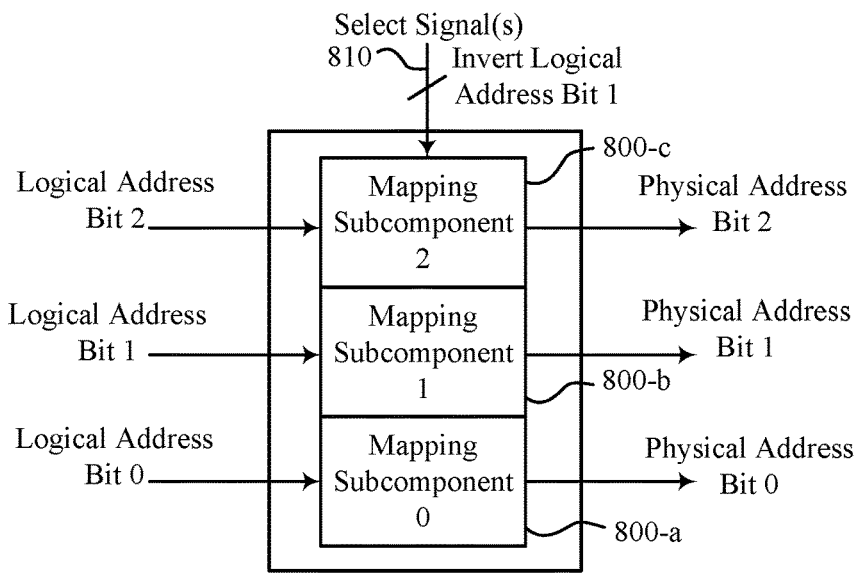
FIGS. 8A and 8B illustrate examples of devices that support address obfuscation for memory in accordance with aspects of the present disclosure.
Figure 8B:
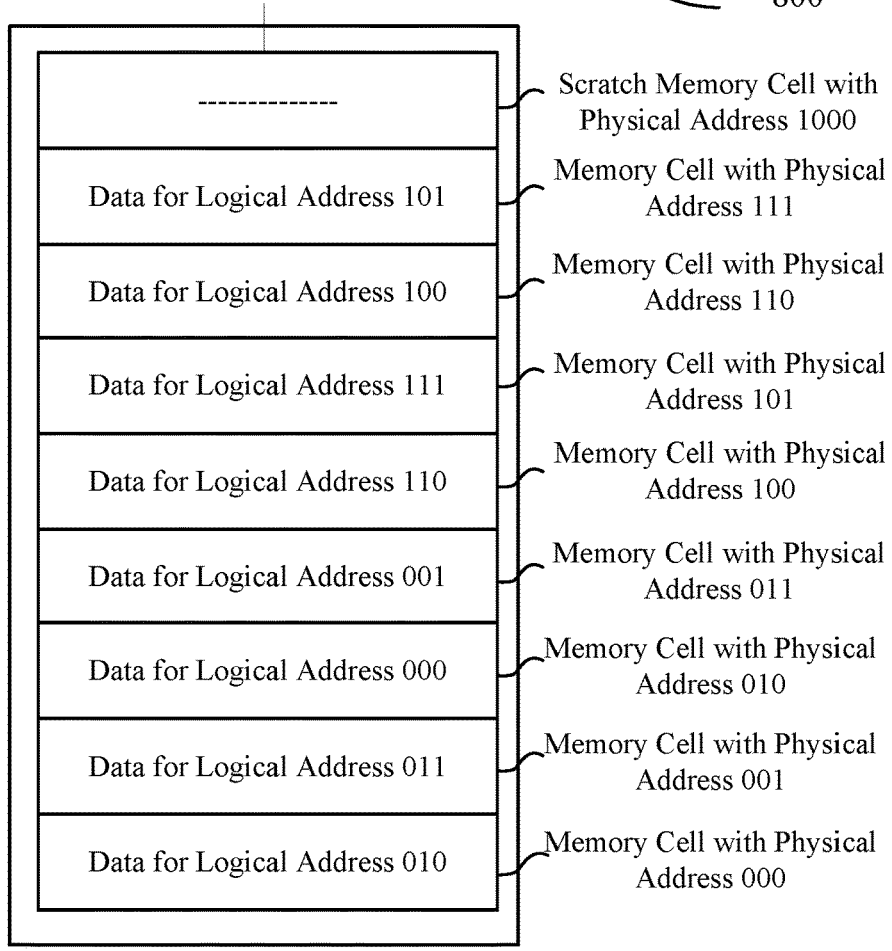

FIGS. 8A and 8B illustrate an example of a mapping component 800 and a table 850 related to a memory array that support address obfuscation for memory in accordance with aspects of the present disclosure. In some examples, discussion of the mapping component 800 and the table 850 may include discussion of one or more components described above. For example, discussion of FIG. 8 may include discussion of physical addresses, logical addresses, and memory cells of memory arrays as described above.

In the examples of FIG. 8A, the mapping component 800 includes three mapping subcomponents, mapping subcomponent 0 800-*a*, mapping subcomponent 1 800-*b*, and mapping subcomponent 2 800-*c*. Similar to FIG. 4A, the select line 810 may select the logic operation implemented by each of the three mapping subcomponents. In one example, the select line 810 may configure mapping subcomponent 0 800-*a* to determine physical address bit 0 by passing through logical address bit 0, mapping subcomponent 1 800-*b* to determine physical address bit 1 by inverting logical address bit 1, and mapping subcomponent 2 800-*c* to determine physical address bit 2 by passing through logical address bit 2.

Table 850 of FIG. 8B, illustrates the resulting mapping of data to memory cells. For example, data with logical address 010 may be mapped to the memory cell with physical address 000, and data with logical address 010 may be mapped to the memory cell with physical address 000. As discussed with respect to mapping component 800, the one bit of the physical address was inverted. The logical address was 010, thus the zero bit was zero, the one bit was one, and the two bit was zero. The mapping component 800 inverted the one bit, thus outputting the physical address 000. In another example, data with the logical address 110 may map to a memory cell with the physical address 100, since the one bit of the physical address was inverted, and so forth.

FIG. 9 illustrates an example of a table 900 that illustrates address obfuscation and wear-leveling for memory in accordance with aspects of the present disclosure. In some examples, discussion of FIG. 9 may include discussion of one or more components described above. For example, discussion of FIG. 9 may include discussion of physical addresses, logical addresses, and memory cells of memory arrays as described above.

Table 900 shown in FIG. 9 illustrates the operation of an example wear-leveling function as previously illustrated in table 600 of FIG. 6, but following an initial address obfuscation according to a different mapping algorithm. As illustrated in table 900, the initial mapping may be performed according to a mapping function in which bit 0 and bit 2 of the initial physical address are determined based on a non-inversion (pass through) of bit 0 and bit 2 of the logical address, respectively, while bit 1 of the initial physical address is determined based on bit 0 of the logical address XOR'd with bit 1 of the logical address and XNOR'd with bit 2 of the logical address.

Thus, the "initial mapping" column in table 900 differs from the "initial mapping" column in table 600 in that the data having logical address 010 (2) is mapped to the memory cell having physical address 000 (0), the data having logical address 000 (0) is mapped to the memory cell having physical address 010 (2), the data having logical address 111 (7) is mapped to the memory cell having physical address 101 (5), and the data having logical address 101 (5) is mapped to the memory cell having physical address 111 (7). Memory cell 8 again functions as a scratch memory cell and may initially be empty, as its physical address 1000 may be beyond the logical address domain.

The movement of the data from memory cell to memory cell over time is in accordance with the same example wear-leveling algorithm previously described with reference to table 600 of FIG. 6. Also as in the example of table 600, it is assumed in the example of table 900 that memory cell 3 (physical address 011) has become defective.

Unlike in the example of table 600, however, the pattern of failing data, as identified by the data's logical address would be, in decimal terms, 3, 0, 1, 2, 5, 6, 7, 4 . . . (as opposed to 3, 2, 1, 0, 7, 6, 5, 4 . . . in table 600). Thus, the "fail pattern" will be different due than in table 600 due to the different mapping algorithm selected for the initial mapping in table 900. Information learned from reverse-engineering the wear-leveling movement pattern based on the mapping function utilized in table 600 will not be useful (e.g., for a row-hammer attack) when the mapping function utilized in table 900 is instead implemented in a memory device, as even though the movement pattern is the same, the ultimate relationship between logical addresses of data and physical addresses of memory cells storing that data is different due to the different mapping function and thus different initial mapping.

As described herein, the mapping function implemented for a memory device may be configurable and variable on a per-logical-address-bit basis based on a selectable set of per-bit logic operations such that an extremely large number of possible mapping functions may be supported (e.g., for logical addresses having N bits, where any one of M logic operations may be selected for each bit, $M^N$ possible mapping functions may be supported). For example, assuming twenty bit logical addresses, with four choices for the logical operation that may be utilized to determine each physical address bit, this may yield over one trillion possible configurations. Further, because the mapping function is dynamically configurable (selectable, variable) and/or variable across devices, dices, arrays, banks, tiles, or other memory entities, the pattern of the mapping function may vary across memory entities or over time, information learned (e.g., by a bad actor) based on one memory entity may not be useful at a later time or for another memory entity. Further, the variable nature of the mapping function may increase the difficulty, or decrease the incentive, for a bad actor to learn a wear-leveling movement pattern in the first place.

As described herein, the physical address bits of the memory cells may be determined according to mapping functions that are unique to each bit and the mapping functions may be selected from any number of functions or algorithms, and as including any number or variety of logical operation, thus resulting in a large number of different configurations.

In some cases, the selection of these mapping functions may be made at the manufacturing level by using fuses or anti-fuses.

In some cases, the mapping function selections may be randomly chosen by randomizing circuits on the memory device. For example, a selection component may select a mapping function based on a number chosen or generated by a number generator or a random number generator or randomization circuit. For example, the number generator may select a number that is odd, thus the mapping function may invert only the one bit to produce the zero bit of the physical address and the one bit and the two bit are non-inverted and passed through to the one bit and the two bit of the physical address. In another example, the number generator may select a number that ends in odd, odd, even, thus the mapping function may be XOR the zero bit and the one bit and non-invert the two bit, and so forth.

In some examples, selecting the mapping function from the set of mapping functions supported by the memory device may be based at least in part on a schedule or a trigger event. The trigger event may be an event such as a boot, reboot, exceeding a predetermined number of accesses, detecting a row hammer event, and so forth.

In some examples, the selection component may select the mapping function based on a unique memory die identifier. For example, the memory die identifier may have multiple digits and if the last three digits are even, even, even, then the selected mapping function may XNOR the one bit and the two bit to produce the zero bit of the physical address and the zero bit and the one bit may be pass throughs to the zero bit and the one bit of the physical address.

There may be any number of elements on which the selection of the mapping function may be based. In yet another example, the randomization may be performed using linear feedback shift register circuits. In yet another example, randomization may be achieved using change crossing of multiple signals such as asynchronous oscillators driving a counter, such that the state may be trapped by a synchronous signal. In yet another example and in the case of volatile memory, the selections may change each time the device is powered on.

In some examples, the manufacturer may test and debug the memory device, and in some cases, the manufacturer may employ direct memory addressing. In some examples, the manufacture may have a security key and may have the ability to select a second mapping function based at least in part on receiving the security key. The security key may allow the manufacturer to enable direct memory addressing (e.g., the second mapping function). When using direct memory addressing the manufacturer may override the selected mapping function so that all the memory cells are non-inverted, thus allowing the manufacturer to perform the relevant testing. This mode may be disabled before shipping the memory device to customers to render it inaccessible to bad actors.

In some examples, the set of logic operations supported by a mapping component or mapping subcomponent may include an inversion operation, a non-inversion operation, an XOR operation, an XNOR operation, a pass-through operation or an address swap function, each of which may be separately selectable. The address swap function may allow the order of address significance to be uniquely independent die to die. The values of the table 950 in FIG. 9, may be produced using a mapping subcomponent in accordance with the mapping functions as discussed with respect to FIGS. 3-8, and configured to achieve the appropriate logic operations.

Figure 10:
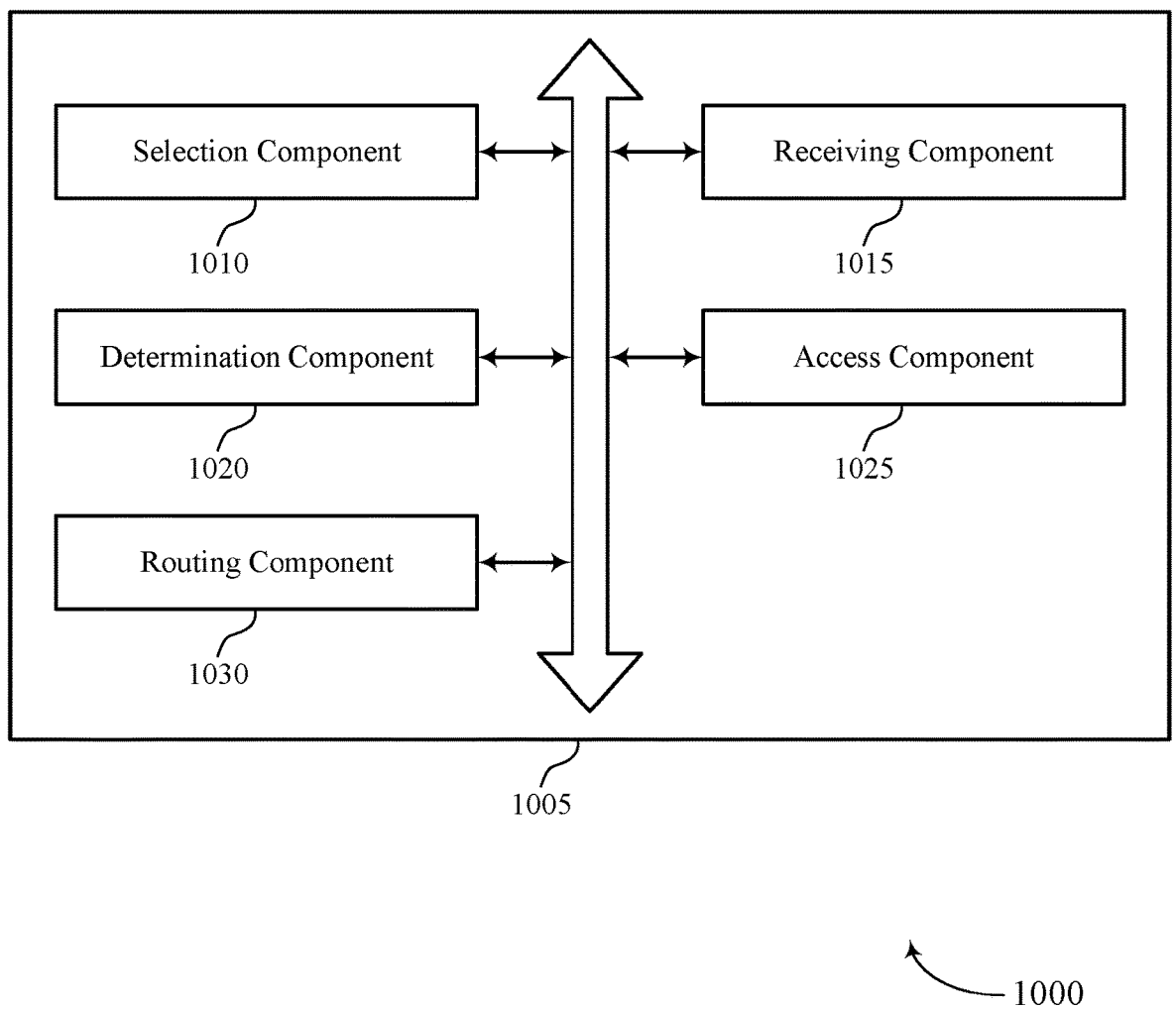
FIG. 10 illustrates a block diagram of a device that supports address obfuscation for memory in accordance with aspects of the present disclosure.

FIG. 10 illustrates a block diagram of a memory device 1005 that supports address obfuscation for memory in accordance with aspects of the present disclosure. In some examples, the memory device 1005 may implement aspects of a memory system as disclosed herein. The memory device 1005 may be similar to the memory devices as described above. The memory device 1005 may include a selection component 1010, a receiving component 1015, a determination component 1020, an access component 1025 and a routing component 1030. Each of these components may communicate, directly or indirectly, with one another (e.g., via one or more buses).

Selection component 1010 may cause the memory device to select a mapping function from a set of mapping functions supported by the memory device. Each mapping function may map logical addresses received at the memory device to physical addresses within a memory array of the memory device.

Receiving component 1015 may cause the memory device to receive an access command including a logical address of data stored in the memory array.

Determination component 1020 may cause the memory device to determine a physical address within the memory array based on the logical address and the selected mapping function.

Access component 1025 may cause the memory device to access the data stored in the memory array based on the physical address.

Figure 11:
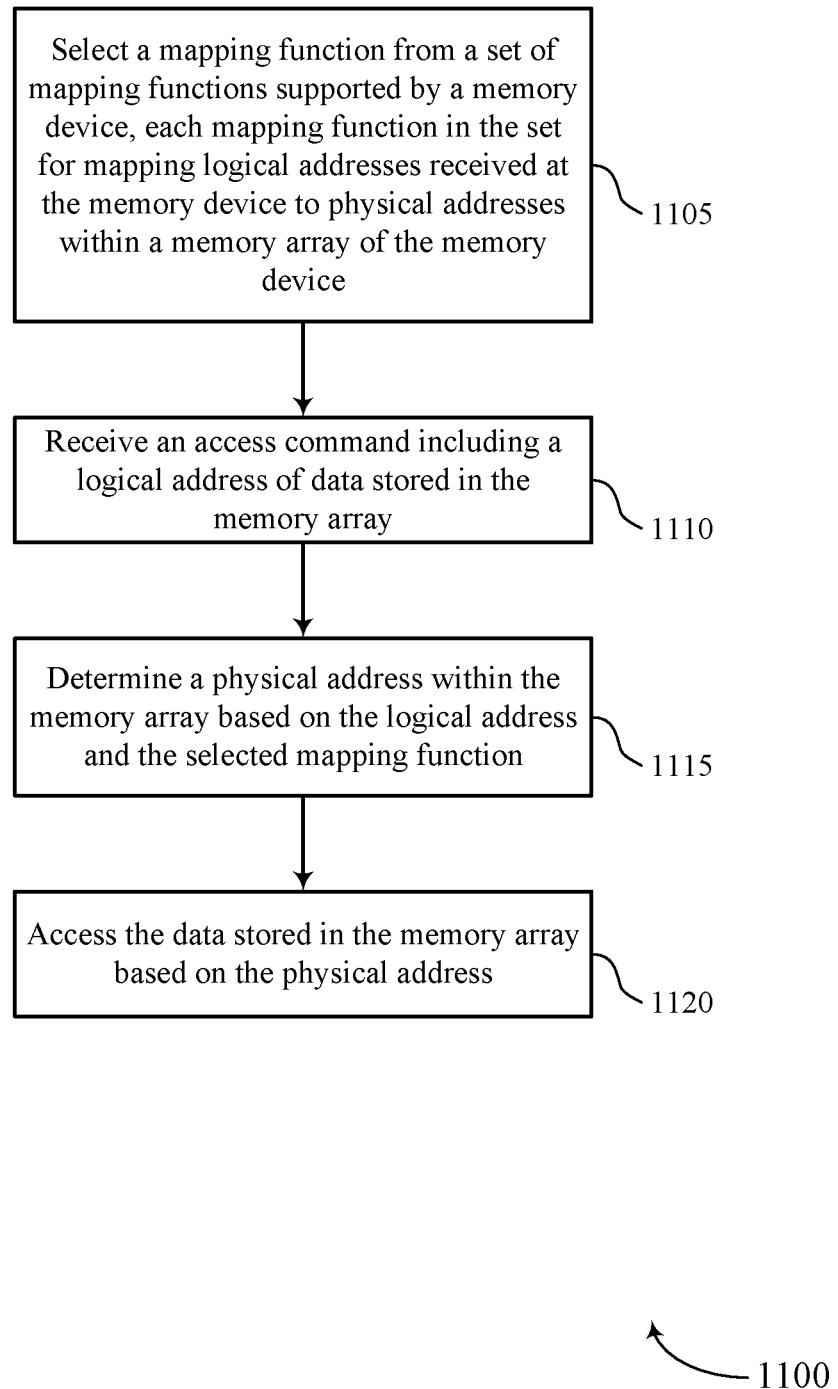
FIGS. 11-13 illustrate flow diagrams that support address obfuscation for memory in accordance with aspects of the present disclosure.

FIG. 11 illustrates a flow diagram that supports address obfuscation for memory in accordance with aspects of the present disclosure. The operations of method 1100 may be implemented by a controller or its components as described herein. For example, the operations of method 1100 may be performed by a controller and memory device as described above. In some examples, a controller may execute a set of instructions to control the functional elements of the memory device to perform the functions described below. Additionally or alternatively, a controller may perform aspects of the functions described below using special-purpose hardware.

At 1105, the controller may select a mapping function from a set of mapping functions supported by a memory device, each mapping function in the set for mapping logical addresses received at the memory device to physical addresses within a memory array of the memory device. The operations of 1105 may be performed according to the methods described herein. In some examples, aspects of the operations of 1105 may be performed by a selection component as described with reference to FIG. 10.

At 1110, the controller may receive an access command including a logical address of data stored in the memory array. The operations of 110 may be performed according to the methods described herein. In some examples, aspects of the operations of 1110 may be performed by a receiving component as described with reference to FIG. 10.

At 1115, the controller may determine a physical address within the memory array based on the logical address and the selected mapping function. The operations of 1115 may be performed according to the methods described herein. In some examples, aspects of the operations of 1115 may be performed by a determination component as described with reference to FIG. 10.

At 1120, the controller may access the data stored in the memory array based on the physical address. The operations of 1120 may be performed according to the methods described herein. In some examples, aspects of the operations of 1120 may be performed by an access component as described with reference to FIG. 10.

In some examples, an apparatus as described herein may perform a method or methods, such as the method 1100. The apparatus may include features, means, or instructions (e.g., a non-transitory computer-readable medium storing instructions executable by a processor) for selecting a mapping function from a set of mapping functions supported by a memory device, each mapping function in the set for mapping logical addresses received at the memory device to physical addresses within a memory array of the memory device, receiving an access command including a logical address of data stored in the memory array, determining a physical address within the memory array based on the logical address and the selected mapping function, and accessing the data stored in the memory array based on the physical address.

In some examples of the methods, apparatuses, and non-transitory computer-readable medium described herein, selecting the mapping function may include selecting, for each bit of the logical address, a corresponding logic operation from a set of logic operations supported by the memory device, each logic operation for determining a bit of the physical address based at least in part on a bit of the logical address In some examples of the methods, apparatuses, and non-transitory computer-readable medium described herein, determining the physical address may include determining a first bit of the physical address based at least in part on a first logic operation from the set, determining a second bit of the physical address based at least in part on a second logic operation from the set In some examples of the methods, apparatuses, and non-transitory computer-readable medium described herein, determining the physical address may include routing each bit of the logical address through a mapping subcomponent configured to implement the corresponding logic operation.

In some examples of the methods, apparatuses, and non-transitory computer-readable medium described herein, the set of logic operations supported by the memory device may include an inversion operation, an exclusive or (XOR) operation based at least in part on a second bit of the logical address, or an exclusive NOR (XNOR) operation based at least in part on the second bit of the logical address, a pass-through operation, an address swap function, or any combination thereof.

Some examples of the methods, apparatuses, and non-transitory computer-readable medium described herein may further include operations, features, means, or instructions for generating a random number, wherein selecting the mapping function is based at least in part on the random number.

Some examples of the methods, apparatuses, and non-transitory computer-readable medium described herein may further include operations, features, means, or instructions for identifying a unique identifier associated with the memory device, the memory array, or a die that includes the memory array, wherein selecting the mapping function is based at least in part on the unique identifier.

In some examples of the methods, apparatuses, and non-transitory computer-readable medium described herein selecting the mapping function from the set of mapping functions supported by the memory device may be based at least in part on a schedule or a trigger event.

Some examples of the methods, apparatuses, and non-transitory computer-readable medium described herein may further include operations, features, means, or instructions for selecting a second mapping function from the set of mapping functions supported by the memory device, receiving a second access command comprising a second logical address for other data stored in the memory array, determining a second physical address within the memory array based at least in part on the second logical address and the second mapping function, and accessing the other data stored in the memory array based at least in part on the second physical address.

Some examples of the methods, apparatuses, and non-transitory computer-readable medium described herein may further include operations, features, means, or instructions for receiving a security key and selecting a second mapping function based on least in part on receiving the security key.

Some examples of the methods, apparatuses, and non-transitory computer-readable medium described herein may further include operations, features, means, or instructions for transferring data between physical addresses within the memory array of the memory device according to a wear-leveling procedure.

In some examples of the methods, apparatuses, and non-transitory computer-readable medium described herein, the physical address corresponds to a physical address space and the logical address corresponds to a logical address space that is smaller than the physical address space.

Figure 12:
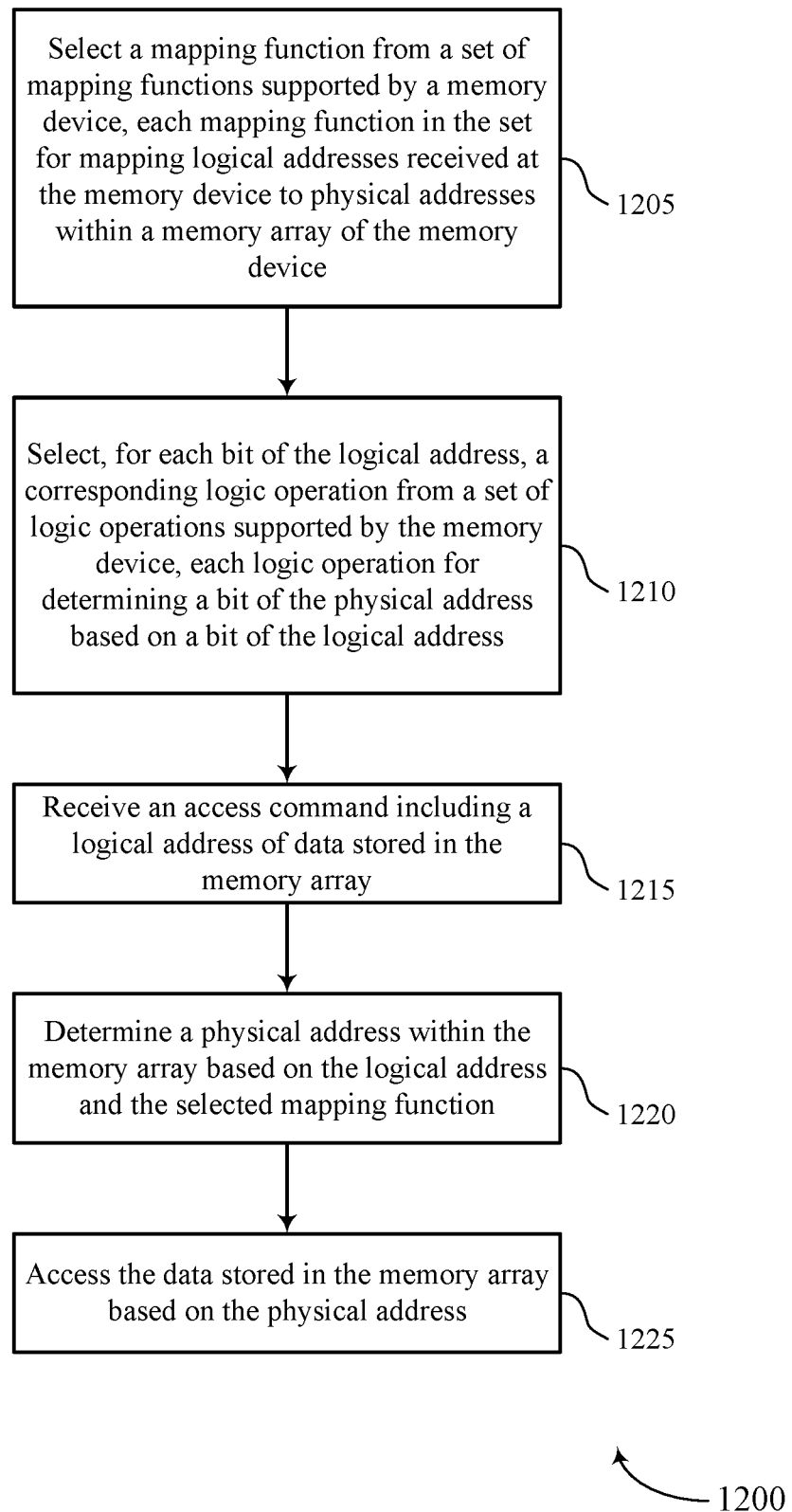

FIG. 12 shows a flowchart illustrating a method 1200 that supports address obfuscation for memory in accordance with aspects of the present disclosure. The operations of method 1200 may be implemented by a controller or its components as described herein. For example, the operations of method 1200 may be performed by a controller as described above. In some examples, a controller may execute a set of instructions to control the functional elements of the memory device to perform the functions described below. Additionally or alternatively, a controller may perform aspects of the functions described below using special-purpose hardware.

At 1205, the controller may select a mapping function from a set of mapping functions supported by a memory device, each mapping function in the set for mapping logical addresses received at the memory device to physical addresses within a memory array of the memory device. The operations of 1205 may be performed according to the methods described herein. In some examples, aspects of the operations of 1205 may be performed by a selection component as described with reference to FIG. 10.

At 1210, the controller may select, for each bit of the logical address, a corresponding logic operation from a set of logic operations supported by the memory device, each logic operation for determining a bit of the physical address based on a bit of the logical address. The operations of 1210 may be performed according to the methods described herein. In some examples, aspects of the operations of 1210 may be performed by a selection component as described with reference to FIG. 10.

At 1215, the controller may receive an access command including a logical address of data stored in the memory array. The operations of 1215 may be performed according to the methods described herein. In some examples, aspects of the operations of 1215 may be performed by a receiving component as described with reference to FIG. 10.

At 1220, the controller may determine a physical address within the memory array based on the logical address and the selected mapping function. The operations of 1220 may be performed according to the methods described herein. In some examples, aspects of the operations of 1220 may be performed by a determination component as described with reference to FIG. 10.

At 1225, the controller may access the data stored in the memory array based on the physical address. The operations of 1225 may be performed according to the methods described herein. In some examples, aspects of the operations of 1225 may be performed by an access component as described with reference to FIG. 10.

Figure 13:
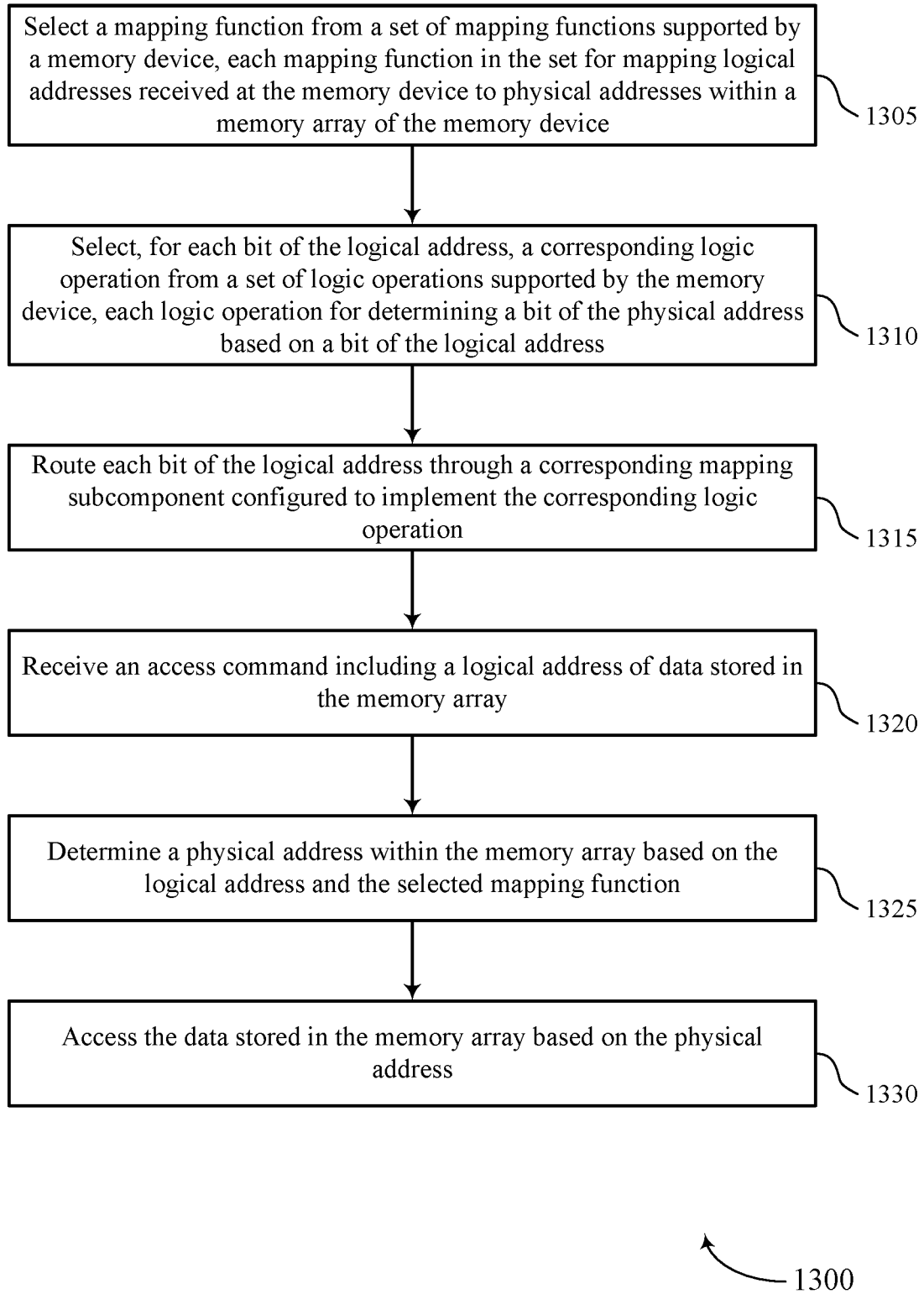

FIG. 13 shows a flowchart illustrating a method 1300 that supports address obfuscation for memory in accordance with aspects of the present disclosure. The operations of method 1300 may be implemented by a controller or its components as described herein. For example, the operations of method 1300 may be performed by a controller as described above. In some examples, a controller may execute a set of instructions to control the functional elements of the memory device to perform the functions described below. Additionally or alternatively, a controller may perform aspects of the functions described below using special-purpose hardware.

At 1305, the controller may select a mapping function from a set of mapping functions supported by a memory device, each mapping function in the set for mapping logical addresses received at the memory device to physical addresses within a memory array of the memory device. The operations of 1305 may be performed according to the methods described herein. In some examples, aspects of the operations of 1305 may be performed by a selection component as described with reference to FIG. 10.

At 1310, the controller may select, for each bit of the logical address, a corresponding logic operation from a set of logic operations supported by the memory device, each logic operation for determining a bit of the physical address based on a bit of the logical address. The operations of 1310 may be performed according to the methods described herein. In some examples, aspects of the operations of 1310 may be performed by a selection component as described with reference to FIG. 10.

At 1315, the controller may route each bit of the logical address through a mapping subcomponent configured to implement the corresponding logic operation. The operations of 1315 may be performed according to the methods described herein. In some examples, aspects of the operations of 1315 may be performed by a routing component as described with reference to FIG. 10.

At 1320, the controller may receive an access command including a logical address of data stored in the memory array. The operations of 1320 may be performed according to the methods described herein. In some examples, aspects of the operations of 1320 may be performed by a receiving component as described with reference to FIG. 10.

At 1325, the controller may determine a physical address within the memory array based on the logical address and the selected mapping function. The operations of 1325 may be performed according to the methods described herein. In some examples, aspects of the operations of 1325 may be performed by a determination component as described with reference to FIG. 10.

At 1330, the controller may access the data stored in the memory array based on the physical address. The operations of 1330 may be performed according to the methods described herein. In some examples, aspects of the operations of 1330 may be performed by an access component as described with reference to FIG. 10.

It should be noted that the methods described above describe possible implementations, and that the operations and the steps may be rearranged or otherwise modified and that other implementations are possible. Furthermore, aspects from two or more of the methods may be combined.

In some examples, an apparatus or device may perform aspects of the functions described herein using general or special-purpose hardware. The apparatus or device may include an interface configured to receive logical addresses for accessing data stored in a memory array, a selection component coupled with the interface and configured to select a mapping function from a set of mapping functions, each mapping function in the set for mapping logical addresses received via the interface to physical addresses within the memory array, and a mapping component coupled with the selection component and configured to map logical addresses received via the interface to physical addresses within the memory array based at least in part on the selected mapping function In some examples, the mapping component includes a plurality of mapping subcomponents each configured to determine a bit of a physical address within the memory array based at least in part on at least one bit of the logical address and at least one logic operation, and the selection component is configured to select the mapping function based at least in part on selecting the corresponding logic operation for each mapping subcomponent of the plurality. In some examples, the selection component is configured to select a first logic operation for a first mapping component of the plurality independent of a second logic operation for a second mapping component of the plurality.

In some examples, the apparatus or device may include a number generator, wherein the selection component is configured to select the mapping function based at least in part on a number generated by the number generator. In some examples, the selection component is configured to select the mapping function based at least in part unique identifier associated with the apparatus. In some examples, the selection component is configured to select the mapping function based at least in part on reading a mode register or non-volatile memory. In some examples, the selection component is configured to select the mapping function based at least in part on a periodic schedule or a trigger event.

In some examples, the apparatus or device may include a wear-leveling component configured to move data between physical addresses within the memory array over time.

In some examples, an apparatus or device may perform aspects of the functions described herein using general or special-purpose hardware. The apparatus or device may include an interface configured to receive logical addresses for a plurality of memory dice, a first memory die of the plurality of memory dice comprising a first memory array and configured to map logical addresses for the first memory array to physical addresses within the first memory array according to a first mapping function, and a second memory die of the plurality of memory dice comprising a second memory array and configured to map logical addresses for the second memory array to physical addresses within the second memory array according to a second mapping function different than the first mapping function.

In some examples, the apparatus or device may include a first mapping component for the first memory die, a second mapping component for the second memory die, and a selection component configured to select the first mapping function for the first mapping component and to select the second mapping function for the second mapping component. In some examples, the selection component is configured to select the first mapping function independent of the second mapping function. In some examples, the first memory die has a first die identifier, the second memory die has a second die identifier, and the selection component is configured to select the first mapping function based at least in part on the first die identifier and the second mapping function based at least in part on the second die identifier.

In some examples, the logical addresses each comprise a plurality of bits, the first mapping component comprises a first corresponding plurality of mapping subcomponents, the second mapping component comprises a second corresponding plurality of mapping subcomponents, and each mapping subcomponent of the first corresponding plurality and of the second corresponding plurality is independently configurable by the selection component.

Although certain features may be described herein with respect to or in the context of DRAM technology, this is for illustrative purposes only, and one of ordinary skill in the art will appreciate that the teachings herein may be applied to any type of memory device. For example, the teachings herein may be applied to volatile or non-volatile memory devices such as magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (e.g., majority carriers are signals), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   identifying, by a memory device that comprises a first memory array, a unique identifier associated with the first memory array or a die that includes the first memory array;

routing, within the memory device, one or more first select signals to implement a first mapping function for the first memory array of the memory device and one or more second select signals to implement a second mapping function for a second memory array of the memory device, wherein the first mapping function and the second mapping function are for use throughout a first time interval, wherein the one or more first select signals are based at least in part on the unique identifier associated with the first memory array, wherein the second mapping function is different from the first mapping function, and wherein the first mapping function and the second mapping function are configured to map logical addresses to physical addresses for the first memory array and the second memory array respectively;

receiving, by the memory device during the first time interval, a first access command associated with a first logical address for first data stored in the first memory array;

using the first mapping function, by the memory device, based at least in part on the one or more first select signals routed within the memory device and further based at least in part on the first data associated with the first logical address being stored in the first memory array, to determine a first physical address within the first memory array, the first physical address corresponding to the first logical address;

accessing, by the memory device, the first data stored in the first memory array based at least in part on the first physical address;

receiving, by the memory device, a security key associated with the memory device; and routing, within the memory device based at least in part on receiving the security key, one or more third select signals to implement a third mapping function for use throughout a second time interval, wherein the third mapping function is different from and overrides the first mapping function, the third mapping function comprising a pass-through logic operation for each bit of logical addresses for the first memory array.

2. The method of claim 1, further comprising:

receiving, by the memory device during the first time interval, a second access command associated with a second logical address for second data stored in the second memory array;

using the second mapping function, by the memory device, based at least in part on the one or more second select signals routed within the memory device and further based at least in part on the second data associated with the second logical address being stored in the second memory array, to determine a second physical address within the second memory array, the second physical address corresponding to the second logical address; and accessing, by the memory device, the second data stored in the second memory array based at least in part on the second physical address.

3. The method of claim 1, further comprising:

routing, within the memory device, one or more fourth select signals associated with a fourth mapping function for the first memory array and one or more fifth select signals associated with a fifth mapping function for the second memory array, wherein the fourth mapping function and the fifth mapping function are for use throughout a third time interval different from the first time interval and the second time interval, wherein the fourth mapping function and the fifth mapping function are configured to map logical addresses to physical addresses for the first memory array and the second memory array respectively, and wherein the fifth mapping function is different from the fourth mapping function, the fourth mapping function is different from the first mapping function, and the fifth mapping function is different from the second mapping function.

4. The method of claim 3, further comprising:

receiving, by the memory device, during the third time interval, a third access command associated with a third logical address for third data stored in the first memory array;

using the fourth mapping function, based at least in part on the one or more fourth select signals routed within the memory device and further based at least in part on the third data associated with the third logical address being stored in the first memory array, to determine a third physical address within the first memory array, the third physical address corresponding to the third logical address; and accessing, by the memory device, the third data stored in the first memory array based at least in part on the third physical address.

5. The method of claim 3, wherein routing the one or more fourth select signals associated with the fourth mapping function and the one or more fifth select signals associated with the fifth mapping function is based at least in part on a trigger event or a schedule.

6. The method of claim 5, wherein the trigger event comprises a boot event, a reboot event, a command from a host device, a quantity of access commands satisfying a threshold, a detection of an attack on the memory device, or any combination thereof.

7. The method of claim 1, wherein the unique identifier comprises a series of numbers associated with the first memory array, and wherein the one or more first select signals are based at least in part on a subset of numbers included within the series of numbers.

8. The method of claim 1, wherein the first mapping function, the second mapping function, or both, comprise a respective set of logic operations including an inverse operation, an exclusive or (XOR) operation, an exclusive NOR (XNOR) operation, an address swap function, a pass-through operation, or any combination thereof.

9. The method of claim 1, further comprising:

generating a random number, wherein the one or more second select signals are based at least in part on the random number.

10. The method of claim 1, further comprising:

receiving, by the memory device, a second access command associated with a second logical address for second data stored in the first memory array;

using the third mapping function, based at least in part on the one or more third select signals routed within the memory device and further based at least in part on the second data associated with the second logical address being stored in the first memory array, to determine a second physical address within the first memory array, wherein the second physical address corresponds to the second logical address, and wherein each bit of the second physical address is identical to a corresponding bit of the second logical address; and accessing, by the memory device, the second data stored in the first memory array based at least in part on the second physical address.

11. An apparatus, comprising:
an interface configured to receive logical addresses, wherein the logical addresses are for accessing data stored in both a first memory array and a second memory array; and
a controller for a memory device that includes the first memory array and the second memory array, wherein the controller is configured to cause the apparatus to:
identify a unique identifier associated with the first memory array or a die that includes the first memory array;
route, within the memory device, one or more first select signals to implement a first mapping function for the first memory array and one or more second select signals to implement a second mapping function for the second memory array, wherein the first mapping function and the second mapping function are for use throughout a first time interval, wherein the one or more first select signals are based at least in part on the unique identifier associated with the first memory array, wherein the second mapping function is different from the first mapping function, and wherein the first mapping function and the second mapping function are configured to map logical addresses to physical addresses for the first memory array and the second memory array respectively;
map, based at least in part on the one or more first select signals, logical addresses received via the interface for the first memory array during the first time interval to physical addresses within the first memory array based at least in part on the first mapping function;
map, based at least in part on the one or more second select signals, logical addresses received via the interface for the second memory array during the first time interval to physical addresses within the second memory array based at least in part on the second mapping function;
access, based at least in part on mapping the logical addresses, data stored in the first memory array, the second memory array, or both, based at least in part on the first mapping function or the second mapping function respectively;
receive a security key associated with the memory device; and
route, within the memory device based at least in part on receiving the security key, one or more third select signals to implement a third mapping function for use throughout a second time interval, wherein the third mapping function is different from and overrides the first mapping function, the third mapping function comprising a pass-through logic operation for each bit of logical addresses for the first memory array.

12. The apparatus of claim 11, wherein the controller is further configured to cause the apparatus to:
route, within the memory device, one or more fourth select signals associated with a fourth mapping function for the first memory array and one or more fifth select signals associated with a fifth mapping function for the second memory array, wherein the fourth mapping function and the fifth mapping function are for use throughout a third time interval different from the first time interval and the second time interval, wherein the fourth mapping function and the fifth mapping function are configured to map logical addresses to physical addresses for the first memory array and the second memory array respectively, and wherein the fifth mapping function is different from the fourth mapping function, the fourth mapping function is different from the first mapping function, and the fifth mapping function is different from the second mapping function.

13. The apparatus of claim 12, wherein the controller is further configured to cause the apparatus to:
map, based at least in part on the one or more fourth select signals, the logical addresses received via the interface for the first memory array during the third time interval to physical addresses within the first memory array based at least in part on the fourth mapping function; and
map, based at least in part on the one or more fifth select signals, the logical addresses received via the interface for the second memory array during the third time interval to physical addresses within the second memory array based at least in part on the fifth mapping function.

14. The apparatus of claim 12, wherein the controller is configured to cause the apparatus to:
route the one or more fourth select signals associated with the fourth mapping function and the one or more fifth select signals associated with the fifth mapping function based at least in part on a trigger event or a schedule.

15. The apparatus of claim 14, wherein the trigger event comprises a boot event, a reboot event, a command from a host device, a quantity of access commands satisfying a threshold, a detection of an attack on a memory device including the first memory array or the second memory array, or any combination thereof.

16. The apparatus of claim 11, wherein the unique identifier comprises a series of numbers associated with the first memory array, and wherein the one or more first select signals are based at least in part on a subset of numbers included within the series of numbers.

17. The apparatus of claim 11, wherein the first mapping function, the second mapping function, or both, comprise a respective set of logic operations including an inverse operation, an exclusive or (XOR) operation, an exclusive NOR (XNOR) operation, an address swap function, a pass-through operation, or any combination thereof.

18. The apparatus of claim 11, wherein the controller is further configured to cause the apparatus to:
generate a random number the one or more second select signals are based at least in part on the random number.

19. An apparatus, comprising:
an interface configured to receive logical addresses for a plurality of memory die; and
a controller for a memory device that includes the plurality of memory die, wherein the controller is further configured to cause the apparatus to:
identify a unique identifier associated with a first memory die of the plurality of memory die or a first memory array of the first memory die;
route, within the memory device, one or more first select signals to implement a first mapping function for the first memory array of the first memory die of the plurality of memory die and one or more second select signals to implement a second mapping function for a second memory array of a second memory die of the plurality of memory die, wherein the first mapping function and the second mapping function are for use throughout a first time interval, wherein the one or more first select signals are based at least in part on the unique identifier associated with the first memory array, wherein the second mapping function is different from the first mapping function, and wherein the first mapping function and the second mapping function are configured to map logical addresses to physical addresses for the first memory array and the second memory array respectively;

access data stored in the first memory array, the second memory array, or both, based at least in part on the first mapping function or the second mapping function respectively;

receive a security key associated with the memory device; and route, within the memory device based at least in part on receiving the security key, one or more third select signals to implement a third mapping function for use throughout a second time interval, wherein the third mapping function is different from and overrides the first mapping function, the third mapping function comprising a pass-through logic operation for each bit of logical addresses for the first memory array.

20. The apparatus of claim 19, wherein the controller is further configured to cause the apparatus to:

route, within the memory device, one or more fourth select signals associated with a fourth mapping function for the first memory array and one or more fifth select signals associated with a fifth mapping function for the second memory array, wherein the fourth mapping function and the fifth mapping function are for use throughout a third time interval different from the first time interval and the second time interval, wherein the fourth mapping function and the fifth mapping function are configured to map logical addresses to physical addresses for the first memory array and the second memory array respectively, and wherein:

the fifth mapping function is different from the fourth mapping function;

the fourth mapping function is different from the first mapping function; and the fifth mapping function is different from the second mapping function.

\* \* \* \* \*